United States Patent [19]

Diaz et al.

[11] Patent Number: 4,858,232
[45] Date of Patent: Aug. 15, 1989

[54] DISTRIBUTED SWITCHING SYSTEM

[75] Inventors: Felix V. Diaz; Jack H. Stanley, both of Plano, Tex.

[73] Assignee: DSC Communications Corporation, Plano, Tex.

[21] Appl. No.: 197,104

[22] Filed: May 20, 1988

[51] Int. Cl.⁴ .................................................. H04J 3/00
[52] U.S. Cl. .................................. 370/86; 340/825.05; 370/89
[58] Field of Search .................. 370/86, 88, 89, 85, 370/108, 95, 94, 110.1, 104; 340/825.05

[56] References Cited

U.S. PATENT DOCUMENTS

| | | | |
|---|---|---|---|
| 3,919,484 | 11/1975 | Mayemchuk | 370/86 |
| 4,002,842 | 1/1977 | Meyr et al. | 370/86 |
| 4,306,304 | 12/1981 | Baxter et al. | 370/86 |
| 4,627,070 | 12/1986 | Champlin et al. | 370/86 |
| 4,713,807 | 12/1987 | Cares et al. | 370/89 |

Primary Examiner—Douglas W. Olms
Assistant Examiner—Frank M. Scutch, III
Attorney, Agent, or Firm—Baker, Mills & Glast

[57] ABSTRACT

A switching system (10) configured in a ring topology (14) is disclosed. The system (10) causes one or more 125 microsecond isochronous frames (20) to circulate in the ring (14) at any given instant in time. A delay circuit (22) temporarily saves an oldest one of the isochronous frames (20) until a youngest one of the isochronous frames (20) has completed its transmission. Consequently, an integral number of isochronous frames (20) circulate in ring (14). The isochronous frame (20) is partitioned to support a random access tunnel channel (26) and a plurality of independently controlled cells (28), which provide a variety of deterministic access services. Each cell (28) contains a control field (30) that contains sufficient information to specify the type of switching service provided by the cell (28) and various service parameters. A time multiplexer (42) separates the tunnel channel (26) from the cells (28). A cell handler (46) separates individual ones of the cells (28) into individual service-specified channels. Other physical layer sections (44, 48-54) adapt these channels to a media access control layer's (56) requirements.

52 Claims, 7 Drawing Sheets

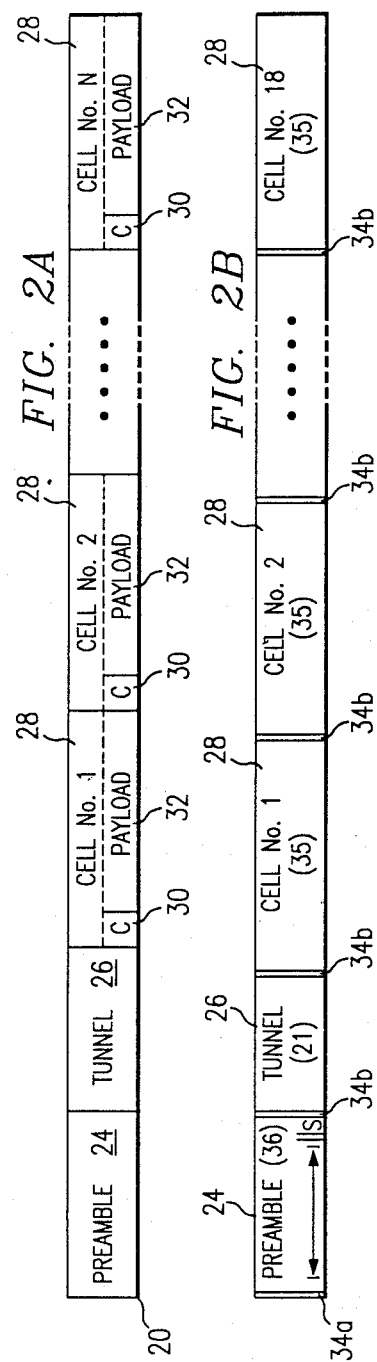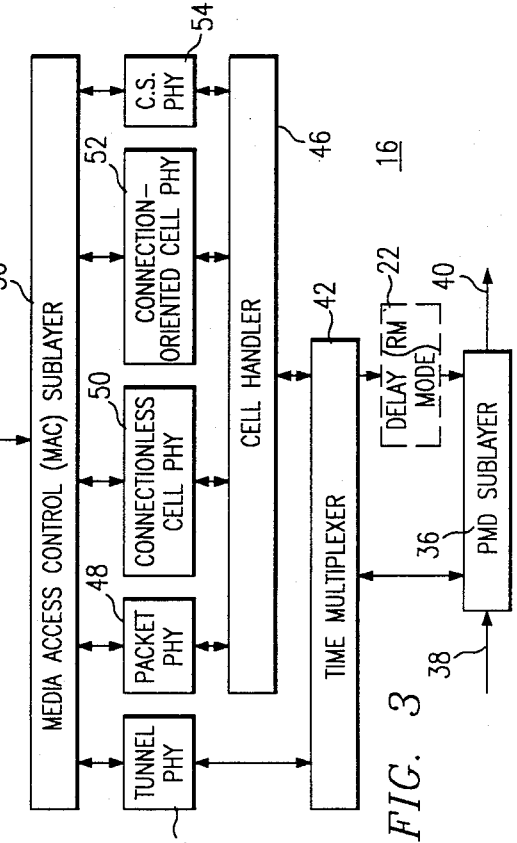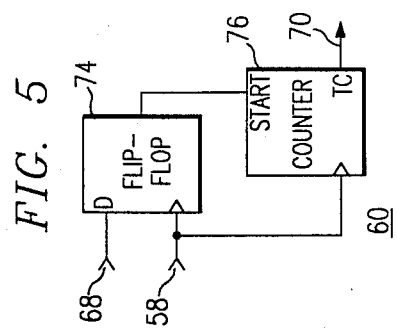

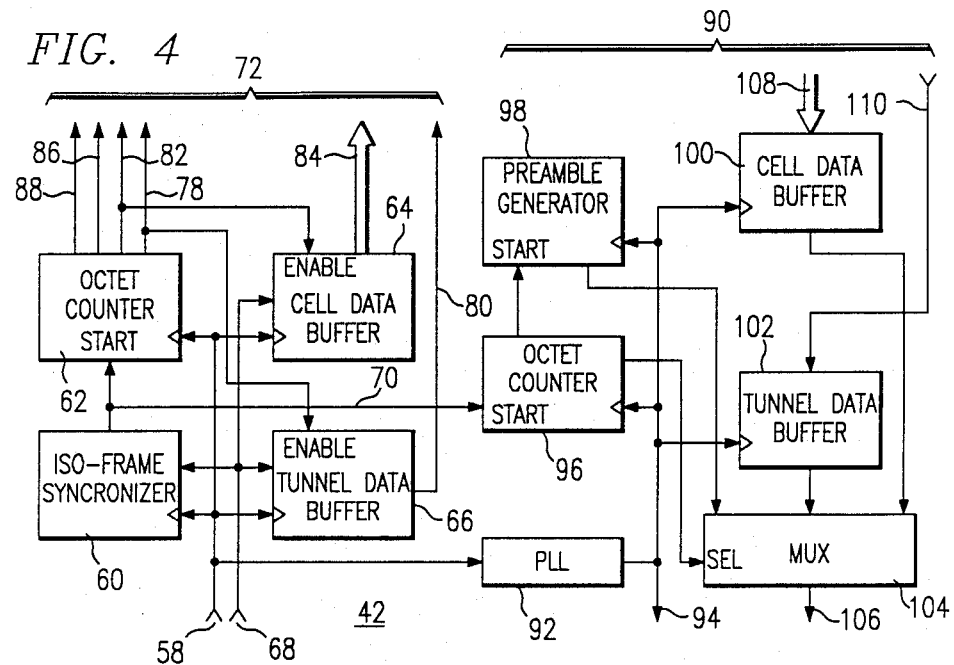
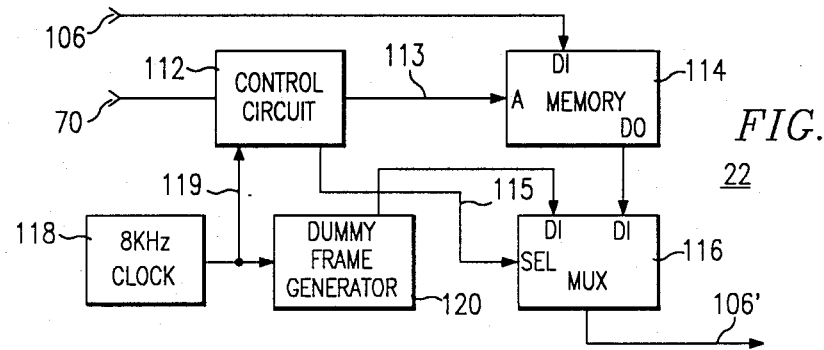
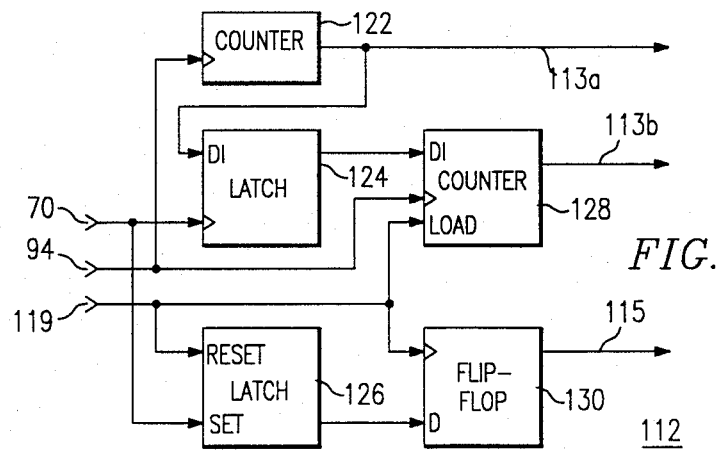

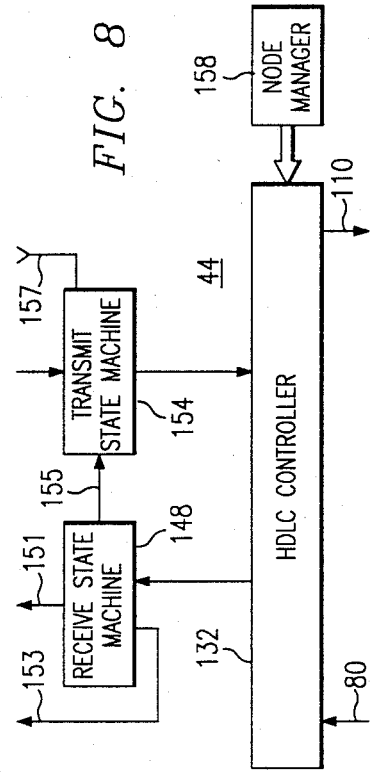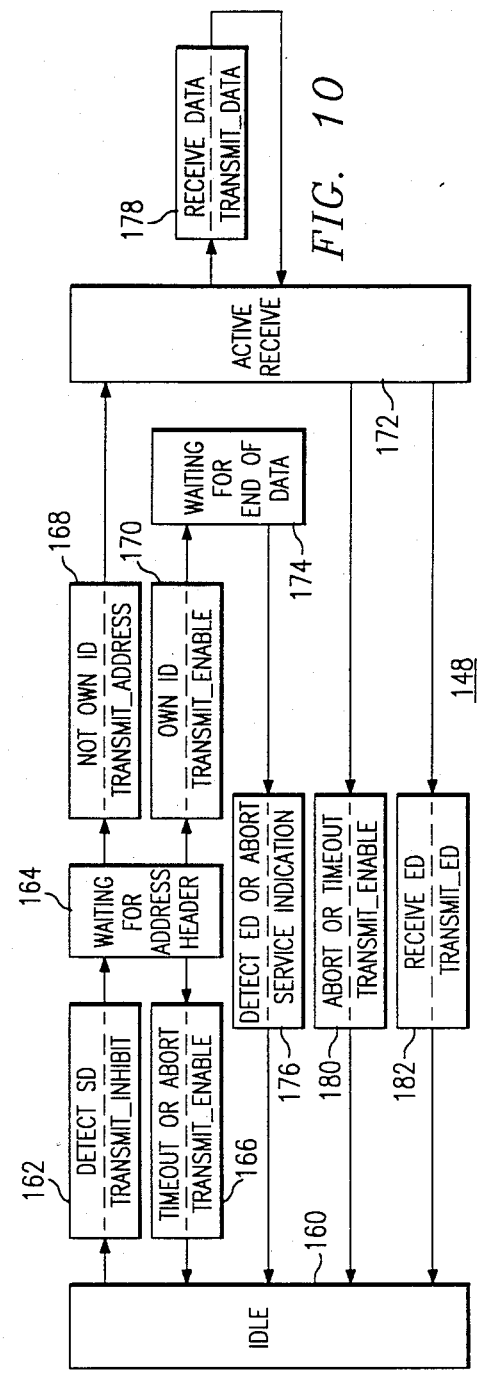

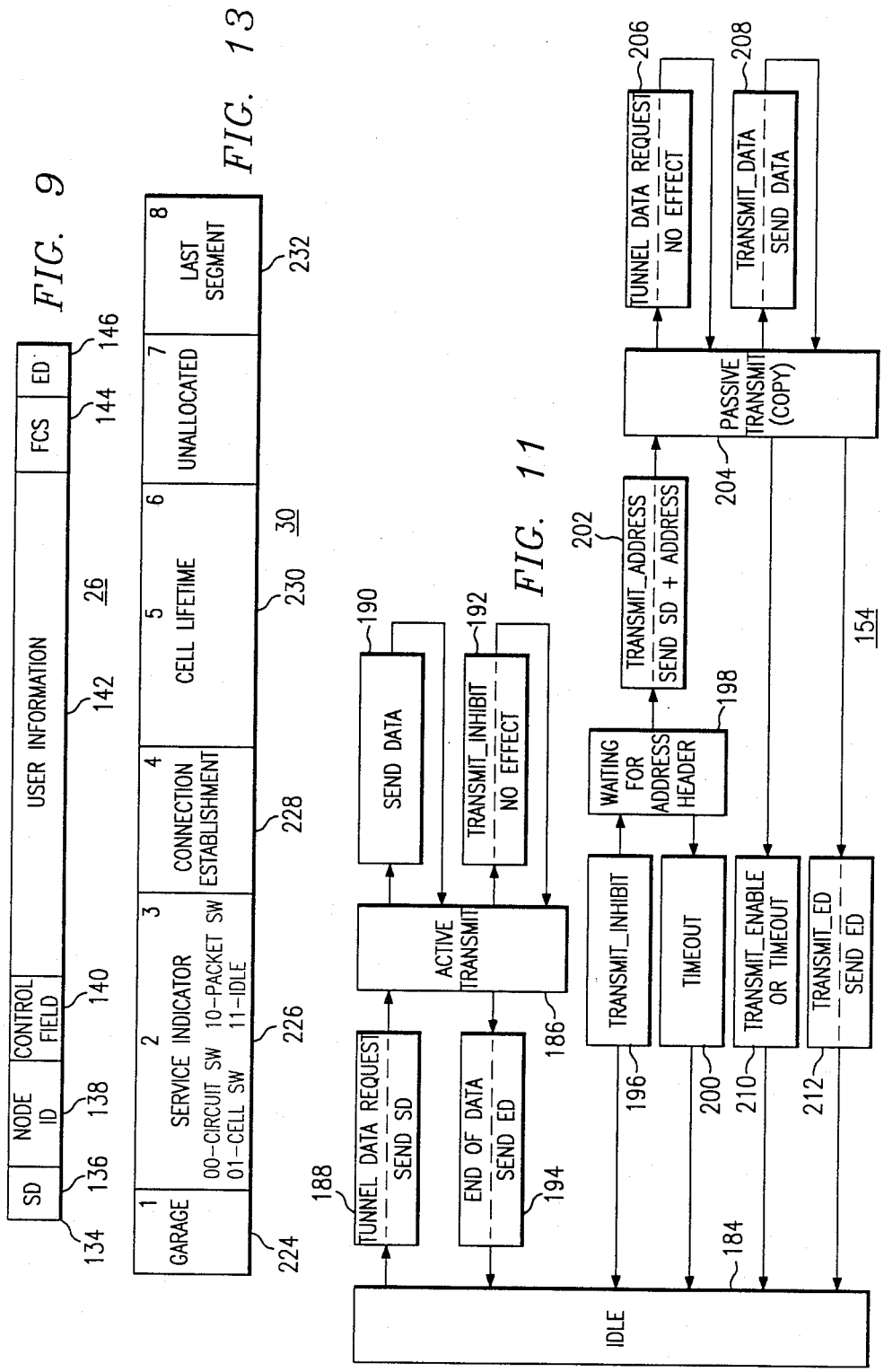

DISTRIBUTED SWITCHING SYSTEM

TECHNICAL FIELD OF THE INVENTION

The present invention relates generally to the field of data communications. More specifically, the present invention relates to data transporting networks which are suitable for use in metropolitan areas.

BACKGROUND OF THE INVENTION

Several schemes are currently used to transport data from one point to another in data communication networks. The telecommunications industry has long used circuit switched, isochronous schemes to transport real-time voice information between points in a network. Circuit switched transmission reserves a guaranteed bandwidth to all users who are granted access to the network. Moreover, this bandwidth is uniformly distributed in time and is configured so that a minimum amount of delay occurs in transporting the information from point to point. For example, a typical voice channel transports 64 kilo-bits per second (Kbps) with only a few milliseconds round trip delay. The typical voice channel uniformly transports one byte or octet of data at regular 125 microsecond intervals.

Computers and other nonreal-time data generating devices may use such circuit switched networks. However, such "computer data" does not typically benefit from the rigid uniform bandwidth requirements of circuit switched isochronous transmission. Rather, the transmission of computer data is typically impaired by the relatively low bandwidth constraints which characterize a single, circuit switched channel. Moreover, circuit switched service reserves bandwidth in the network even though the user for whom such bandwidth has been reserved is not utilizing the bandwidth. Consequently, computers and other nonreal-time data generating devices may not be able to effectively utilize the reserved bandwidth over a long period of time, and the use of circuit switched service for computer data often proves expensive. Therefore, packet switched networks have evolved to address needs associated with the transmission of computer data.

In particular, forms of computer networking known as Local Area Networks (LANs) have emerged recently. LANs can be categorized in two major categories. The two categories primarily differ from one another in the manner in which they grant access to a shared medium. One category provides a deterministic access service, and the other category provides a random access service. Neither category provides a guarantee of uniform average bandwidth to its users. Consequently, such networks are generally unacceptable for transporting real-time demanding information. However, both categories typically allocate the full available bandwidth of the media transporting the data to a user who has been granted access to the network. Thus, such packet switching schemes favor the transmission of computer data when compared to circuit switched schemes because they do not reserve unused bandwidth. Moreover, overall bandwidth utilization improves, and such packet switched services may be provided to computer users more cheaply than a circuit switched service.

A token passing technique is commonly used to provide a deterministic access service in ring-shaped LANs. In such a "token passing ring", nodes in the ring may transmit data only when they capture a token, regardless of whether the media over which data is being transmitted is currently idle. Typically, there is only one token in the ring at any given time. Therefore, only one node has authorization to transmit, and that one node is the node that holds the token at any given instant in time. Regardless of whether the node holding the token has some information to transmit, the token-holding node is required to release the token after some maximum specified period of time. Upon release of the token, the token reaches the next node downstream, and the process repeats. In general, utilization of the data transporting medium may be relatively high when a network is configured as a token passing ring. However, undesirably long access times characterize conventional token passing rings because a node wishing to transmit data must wait for the token to circulate to it through the ring before it can initiate a transmission. Consequently, for either real-time data, large networks, or small networks when data traffic load is light, such access delays are particularly undesirable.

A carrier sensing multiple access/collision detection (CSMA/CD) service represents a conventional random access technique which is commonly associated with bus-shaped LANs. In CSMA/CD, if the medium over which data to be transmitted is not currently being used to transmit data, each node coupled to the medium may assume that the media is immediately available. Therefore, any station is permitted to begin a transmission after detecting the absence of a carrier prior to the transmission. If two or more stations happen to begin transmissions within a short interval of time, their transmissions collide and neither transmission successfully reaches its destination. However, in CSMA/CD the nodes are capable of listening to their own transmissions and of detecting such a collision. The nodes then stop transmitting for an arbitrary period of time, after which they try again.

Performance characteristics of CSMA/CD differ from those of token passing rings. Overall bandwidth utilization is typically less with CSMA/CD. However, when the network carries only a low data traffic load as compared to the total bandwidth of the medium, the access time improves over token passing rings. Still, access delay and throughput is not guaranteed. Consequently, for real-time data applications or for networks experiencing heavy data traffic, CSMA/CD services demonstrate undesirable performance characteristics.

In most applications, a network's data traffic load is not constantly high or low but changes dynamically according to the time of day. Therefore, regardless of whether a network provides a token passing ring service or a CSMA/CD service, it may be expected to provide inadequate service in one way or another at various times of the day.

Moreover, such conventional token passing and CSMA/CD LANs do not adequately serve the needs of a metropolitan area network (MAN). A MAN typically occupies a much larger geographical area than a LAN, supports more stations than a LAN, and permits indirect attachment of stations. In both conventional token passing and conventional CSMA/CD LANs, a network may transport only one data item at any instant in time. In other words, multiple, simultaneous accesses by various stations are not permitted. Although such limitation may not greatly impact a smaller LAN, a larger MAN would be significantly harmed by such single access schemes due to the increased propagation delay associated with transmitting data over large distances and the potentially large number of stations attached to the MAN.

Still further, such conventional token passing and conventional CSMA/CD access techniques do not adequately adapt to a network where each node in the network supports a multiplicity of users. Such multiplicity of users may include additional LANs or MANs which couple through a bridge. Conventional token passing and CSMA/CD LANs utilize a set of software procedures called Media Access Control (MAC) to format and transmit messages which the network carries. A message typically includes a relatively large address field, typically around 48 bits. The address field is used to specify message recipients. When each node in the network supports a multiplicity of users, the MAC sublayer in each node must open the MAC level message, examine the address field, and perform a sort operation to determine if one of the users supported by the node is the specified message recipient. This is a cumbersome process, and it must be completed before a node is able to dispose of the message. All nodes repeat this process. Consequently, overall performance suffers when conventional LAN switching and access techniques are utilized in large networks.

As discussed above, a conventional circuit switched service supports the transmission of real-time data, but a conventional packet switched service fails to adequately transmit real-time data. Conversely, a conventional packet switched service efficiently transmits non-real-time "computer data", but a conventional circuit switched service fails to adequately serve non-real-time data needs.

In order to address problems related to the incompatibilities between circuit switched service and packet switched service, a hybrid scheme referred to as a slotted ring (or bus) has been developed. In a slotted ring the entire capacity, or bandwidth, of the network medium is time divided into time slots of equal size. The slotted ring typically allocates a number of slots to a circuit switched service and the remainder of the bandwidth to a packet switched service. This allocation may be done dynamically in some cases. The circuit switched portion of the bandwidth provides a uniform isochronous channel which is suitable for the transmission of real-time demanding data. Although the slotted ring permits transmission of both real-time and computer data, it does not improve upon the performance of LANs, as discussed above. Moreover, it provides an "all or nothing" approach to data transmission services where an instantaneous access time is provided by the circuit switched service and a poor access time is provided by the packet switched service.

Consequently, a need exists for an intermediate class or classes of data transmission services with access performance levels between a circuit switched, isochronous service and a packet switched service. Such intermediate services would be better adapted to the needs of high speed data users, real-time data users, such as video users, and computer users who require relatively quick access times or a guarantee of a minimum available bandwidth. Moreover, a need exists for a network which improves bandwidth utilization when distributed over a metropolitan area and which efficiently supports a large number of stations.

SUMMARY OF THE INVENTION

Accordingly, it is an advantage of the present invention that an improved transmission network is provided which is suitable for use in a metropolitan area.

Another advantage of the present invention is that a plurality of transmission services are provided so that a user may select a service which most closely matches the user's needs.

Still another advantage of the present invention is that a class of data transmission services which are intermediate in access performance to circuit switched and packet switched services is provided.

Yet another advantage of the present invention is that a distributed switching network is provided wherein overall bandwidth utilization improves.

Another advantage of the present invention is that a random access service is provided in a ring topology which supports virtually instantaneous access.

Yet another advantage of the present invention is that a cell switching service is provided so that the entire media bandwidth may be partitioned into independent bandwidth portions wherein the individual bandwidth portions are better adapted to the needs of switching system users.

Another advantage is that multiple communications can be simultaneously maintained between the same or different users without the need to arbitrate access to the medium.

Still another advantage is that switching may be performed on a cell-by-cell basis where each cell carries its own routing information so that speed and efficiency in the switching process improves.

The above and other advantages of the present invention are carried out in one form by a plurality of nodes which couple together to form a ring wherein each node receives incoming data from a first adjacent one of the nodes and transmits outgoing data to a second adjacent one of the nodes. One of the nodes is designated as a ring master. The ring master contains a circuit for delaying the outgoing data transmitted at the ring master relative to the incoming data received at the ring master. Additionally, the ring master contains a circuit which controls the amount of delay introduced by the delaying circuit so that a constant quantity of data circulates in the ring. This constant quantity of data is maintained at a level where it is divided into an integral number of frames. Moreover, each of the nodes includes a circuit which dedicates one portion of each of the frames to random access service.

In another aspect of the present invention, a distributed switching system includes a plurality of nodes which couple together to form a ring. Each of the nodes in the ring receives incoming data from a first adjacent one of the nodes and transmits outgoing data to a second adjacent one of the nodes. One of the nodes is designated as a ring master. The ring master node includes a circuit for delaying the outgoing data transmitted from the ring master node relative to the incoming data received at the ring master node. Moreover, a controlling circuit controls the delaying circuit to maintain a constant quantity of data circulating in the ring. This constant quantity is established so that it is divided into an integral number of frames. Furthermore, each of the nodes includes a circuit which divides each of the frames into a plurality of independent cells. Each of the cells contains control information to specify one of a plurality of distinct deterministic access services to which each of the cells is dedicated.

BRIEF DESCRIPTION OF THE DRAWINGS

A more complete understanding of the present invention may be derived by referring to the detailed description and claims when considered in connection with the figures, wherein like reference numbers refer to similar items, and:

FIG. 2A illustrates a generalized format for an isochronous frame utilized in the present invention;

FIG. 2B illustrates a DS3-specific format for the frame shown in FIG. 2A;

FIG. 3 shows a block diagram of an individual node portion of the present invention;

FIG. 4 shows a block diagram of a time multiplexer portion of the present invention;

FIG. 5 shows a block diagram of an iso-frame synchronizer portion of the present invention;

FIG. 6 shows a block diagram of a delay circuit portion of the present invention;

FIG. 7 shows a block diagram of a control circuit portion of the delay circuit shown in FIG. 6;

FIG. 8 shows a block diagram of a tunnel physical sublayer portion of the present invention;

FIG. 9 shows a format of a tunnel frame utilized in connection with the tunnel physical sublayer shown in FIG. 8;

FIG. 10 shows a state diagram of a receive state machine of the tunnel physical sublayer portion of the present invention;

FIG. 11 shows a state diagram of a transmit state machine of the tunnel physical sublayer portion of the present invention;

FIG. 13 shows a format of a control octet portion of a cell utilized in connection with the present invention;

DETAILED DESCRIPTION OF THE PREFERRED EMBODIMENT

Figure 1:
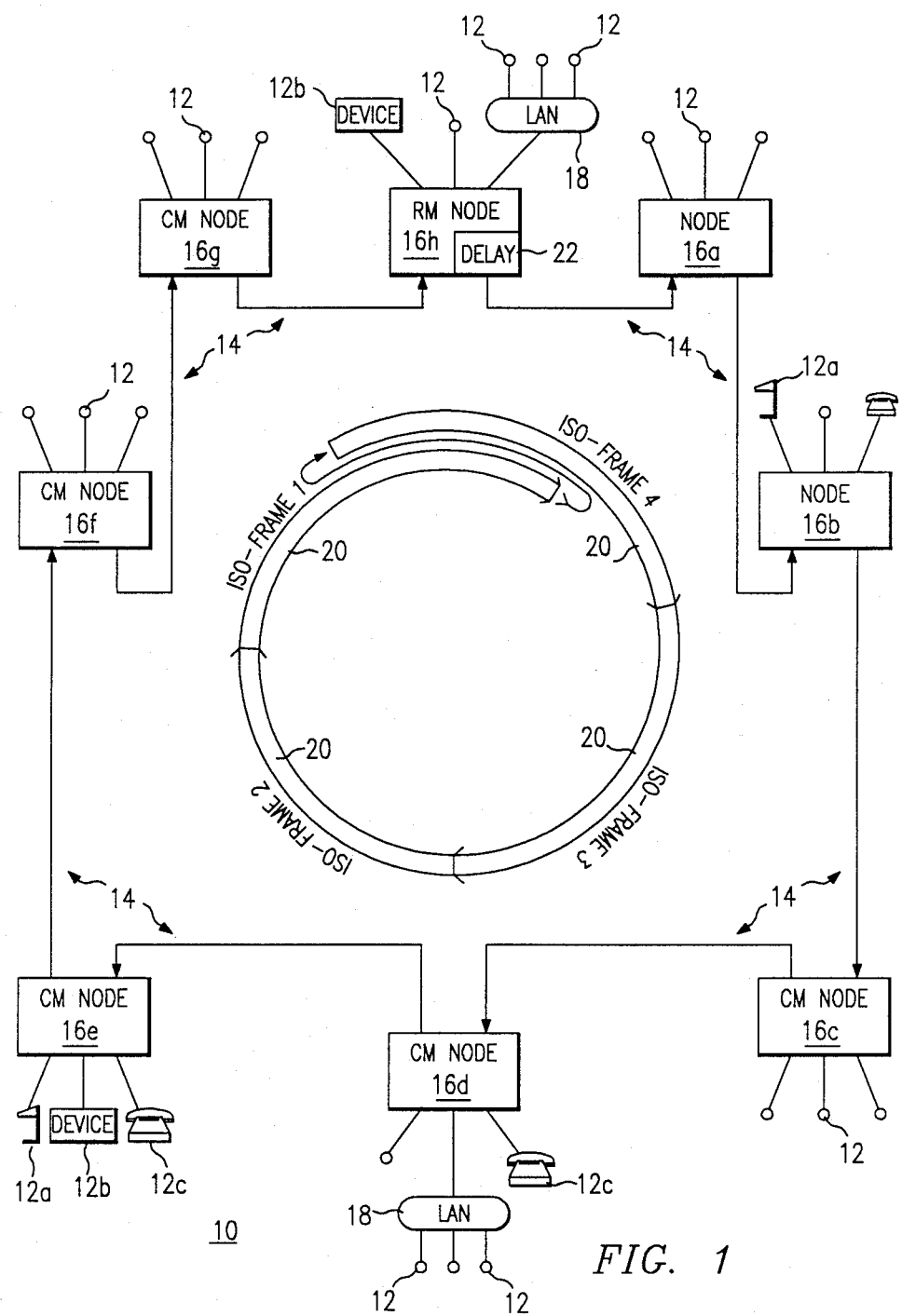
FIG. 1 schematically illustrates a distributed switching system constructed in accordance with the present invention.

FIG. 1 shows a schematic diagram of a switching system 10 constructed in accordance with the present invention. Switching system 10 transmits data from any one of users 12 to any other one of users 12 through a ring 14. Ring 14 includes a plurality of nodes 16a–16h coupled together in a ring topology. In other words, an input of each one of nodes 16a–16h couples to an output of an upstream adjacent one of nodes 16a–16h, and an output of each of nodes 16a–16h couples to an input of a downstream adjacent one of nodes 16a–16h. As shown in FIG. 1, an upstream node resides counterclockwise relative to a downstream node in ring 14.

Each of nodes 16a–16h additionally couples to one or more of users 12 in a star-like manner. Users 12 include computer terminals 12a, computer devices 12b, real-time data users 12c, and the like. Real-time data users 12c include conventional telephone sets. Moreover, users 12 may couple to nodes 16a–16h through networks 18, such as conventional local area networks (LANs). Each of nodes 16a–16h has a unique ID, and each of users 12 has a unique route ID relative to all other route IDs coupled to a particular one of nodes 16a–16h. Consequently, by knowing a node ID and a route ID of an intended target for data in addition to a user's own ID, any one of users 12 may communicate with another one of users 12.

Of course, those skilled in the art will recognize that the precise number of nodes and users in system 12 is subject to wide variation. Moreover, in the preferred embodiment, system 10 may extend over a large geographical "metropolitan" area and encompass hundreds of nodes 16a–16h, each of which couples to hundreds of users 12.

System 10 represents a distributed switching system. Since system 10 is distributed, the intelligence or responsibility for operating switching system 10 is spread over a large number of nodes. Consequently, the advantages which accrue to distributed systems in general also apply to switching system 10. For example, the design of system 10 is relatively simple when compared to a centralized system, and a high degree of redundancy is provided because the hardware at each of nodes 16a–16h is substantially identical with the hardware provided at the other ones of nodes 16a–16h. Furthermore, system 10 utilizes only a few unique components which may be produced in high quantity to a high degree of quality.

In the preferred embodiment, system 10 operates using repetitive, 125 microsecond isochronous frames (iso-frames) 20. Moreover, the quantity of data circulating in ring 14 is controlled through the use of a delay circuit 22 contained in a ring master node 16h so that an integral number of iso-frames 20 exist in ring 14 at any given instant in time.

Only one of nodes 16a–16h operates as the ring master for ring 14. However, other ones of nodes 16a–16g may become a ring master upon failure of ring master 16h. At initialization, ring master node 16h begins transmission of a first iso-frame 20 toward node 16a. While the first one of iso-frames 20 is being received at node 16a, node 16a partially or entirely copies or replaces the information carried within the first one of iso-frames 20. Simultaneously, first node 16a transmits the first one of iso-frames 20 toward node 16b in ring 14. During this process, first node 16a incurs some delay between the reception and transmission of data. This delay represents node latency.

Nodes 16b–16g in ring 14 repeat the operation described above for node 16a until the first one of iso-frames 20 returns to ring master node 16h. While this operation is being repeated, ring master 16h continues outputting second, third, and fourth ones of iso-frames 20 at the rate of one iso-frame 20 every 125 microseconds. The total latency of ring 14 is the combined propagation delay within ring 14 plus the node latencies for all of nodes 16a–16h. This total latency is between 375 and 500 microseconds for the example illustrated in FIG. 1. Moreover, ring master node 16 completes transmission of the first, second, and third ones of iso-frames 20 before the first one of iso-frames 20 has returned to ring master node 16h. In the FIG. 1 example, ring master node 16h is in the process of transmitting the fourth one of iso-frames 20 when the beginning of the first one of iso-frames 20 arrives back at ring master node 16h.

Upon the arrival of the first one of iso-frames 20 back at ring master node 16h, ring master node 16h buffers it in delay circuit 22 while continuing to transmit the remainder of the fourth one of iso-frames 20. The buffering of the first one of iso-frames 20 continues in delay circuit 22 until the end of the fourth one of iso-frames 20 occurs. At this point, rather than issuing a fifth one of iso-frames 20, ring master node 16h retransmits the entire first one of iso-frames 20, which is at least partially stored in delay circuit 22. Of course, those skilled in the art will recognize that the precise number of iso-frames 20 existing within ring 14 varies depending upon the size and total latency of ring 14. Thus, ring 14 may contain less than one of iso-frames 20 or more than four of iso-frames 20.

Consequently, for a ring 14 having a total ring latency of $125 * N \leq T$ (in microseconds) $< 125 * (N+1)$ where $N=0, 1, 2, \ldots$, master node 16h maintains an integral number $N+1$ of iso-frames 20 circulating in ring 14. At any given instant in time, the oldest one of iso-frames 20 is at least partially stored in delay circuit 22 while the newest one of iso-frames 20 is being generated at ring master node 16h. This mechanism guarantees the periodicity of the 125 microsecond iso-frames 20 when observed at any point in ring 14. In other words, any instant of each one of iso-frames 20, such as the beginning of an iso-frame 20, repeats itself at exactly 125 microsecond intervals. However, such instances are not in the same one of iso-frames 20 unless there is only one of iso-frames 20 circulating in ring 14. In this way, a variety of services, including circuit switched isochronous service, may be supported by ring 14.

Node 16g in ring 14 is designated as a connection manager in the preferred embodiment of the present invention. Connection manager node 16g may, but need not, be the same node as ring master 16h. Connection manager node 16g acts as a clearing house for all other ones of nodes 16a-16h in ring 14 as they request the assignment of connection oriented (e.g. circuit switched) bandwidth. Connection manager 16g maintains and updates maps reflecting the status of the bandwidth for the various services provided by switching system 10. Such services include a circuit switching voice and data transmission service, a packet switching service, a connection-oriented cell switching service, and a connectionless cell switching service. In addition, connection manager 16g may provide directory services wherein node IDs and routing information are provided to nodes 16a-16h upon request.

Connection manager 16g guarantees that the total amount of bandwidth allocated by switching system 10 does not exceed the total network capacity at any given instant in time. Such an excess would degrade the quality of provides services. Accordingly, prior to an assignment of circuit switched bandwidth to a requesting one of nodes 16a-16h, switching system 10 must have some fraction of iso-frames 20 available for circuit switching service. In the preferred embodiment, the minimum amount of bandwidth that connection manager 16g can allocate to circuit switching is one cell. A cell (discussed below) represents a fractional portion of an iso-frame 20. At any given instant in time, a fraction of the usable bandwidth of switching system 10, from none to all cells, may be reserved for circuit switching service. Within each of the reserved cell or cells, multiple circuit switched connections may be established. The bandwidth associated with each individual circuit switched connection may vary from one bit to the entire capacity of the cell. One characteristic of circuit switching service is its uniform repetition rate of 125 microseconds. Consequently, when more than one iso-frame 20 circulates in ring 14, connection manger 16g reserves equivalent cells in all of isochronous frames 20 circulating in ring 14 before circuit switched connections are established.

FIG. 2A shows a generalized format of iso-frame 20 for a preferred embodiment of the present invention. In the preferred embodiment, a preamble field 24 occurs first in iso-frame 20. Preamble field 24 provides information which allows each of nodes 16a-16h (see FIG. 1) to synchronize to iso-frame 20. Next, a tunnel field 26 serves as a channel which provides a random multiple access service to nodes 16a-16h of system 10. Those skilled in the art will understand a random access service to generally describe the types of data communication services where nodes in a network, such as system 10, have the authority to transmit data over a shared communication medium at any time the medium is idle or otherwise not being used by other nodes. In the preferred embodiment, tunnel 26 is primarily intended to convey signaling, control, alarms, priority messages, and the like between nodes 16a-16h. Any one of nodes 16a-16h may transmit a message to any other one of nodes 16a-16h using tunnel 26. The transmitting one of nodes 16a-16h uses a random multiple access mechanism, not subject to token arbitration, in accessing tunnel channel 26.

Following tunnel 26, iso-frame 20 contains a plurality of independent cells 28. FIG. 2A labels cells 28 as cell numbers 1 through N. Each of the N cells 28 includes a control field 30 followed by a payload field 32. Control field 30 provides sufficient information to independently specify a type of service to which the corresponding one of cells 28 is dedicated at a given time and for specifying various service parameters. Consequently, each one of the N cells 28 in iso-frame 20 represents an independently switchable entity.

In the preferred embodiment, cells 28 are primarily intended to provide various types of deterministic and probabilistic access services. Those skilled in the art will understand a deterministic access service to generally describe the types of data communication services where nodes in a network, such as system 10, have the authority to transmit data over a shared medium at predetermined intervals assigned in advance to these nodes or otherwise assigned on demand and in an orderly manner.

In the preferred embodiment, each one of preamble 24, tunnel 26 and cells 28 maintains a constant bandwidth from iso-frame 20 to iso-frame 20 so that hardware is simplified in partitioning iso-frames 20 into the individual channels. The length of preamble 24, tunnel 26, as well as the number N of cells 28 contained within iso-frame 20, varies depending upon the type of physical medium used in implementing ring 14. This variance directly results from the different capacities, i.e. octets per frame, of the particular medium utilized to implement ring 14. FIG. 2B shows a specific example of an iso-frame 20 adapted to a DS3 medium. A DS3 medium payload is approximately 44.210 Mbps. The maximum integer number of octets that can be carried every 125 microseconds is 690. Consequently, each iso-frame 20 for a DS3 medium includes 690 octets of data and padding information.

In the preferred embodiment, preamble 24 of iso-frame 20 for a DS3 medium first includes a bit padding section 34a, which in the preferred embodiment includes five bits that are all set to a logical one value. Next, preamble 24 in iso-frame 20 contains 36 octets of data. The first 35 octets of data in preamble 24 have each bit therein set to a logical one value in the preferred embodiment. A 36th octet in preamble 24 supplies a frame sequence number which aids connection manager 16g (see FIG. 1) in maintaining statistics and establishing the status of services provided by switching system 10. Next, tunnel 26 includes 21 octets of data plus a preceding padding bit 34b, which in the preferred embodiment is set to a logical zero value. Finally, eighteen of cells 28 follow tunnel 26. Each of the eighteen cells 28 includes 35 octets of data plus a preceding padding bit 34b. As discussed above, padding bits 34b are each set to a logical zero value in the preferred embodiment. Thus, the preferred embodiment for a DS3 payload dedicates 632.250 octets to deterministic cell switched service, 21.125 octets to random access service through tunnel channel 26, and 36.625 octets to preamble 24. Consequently, a DS3 iso-frame 20 contains 690 octets which, when transmitted at a rate of one iso-frame 20 every 125 microseconds, achieves the payload rate of 44.160 Mbps.

Of course, those skilled in the art will recognize that the specific DS3 example presented in FIG. 2B may be altered to achieve the same functions described herein. Moreover, other types of transmission media, such as the ANSI fiber distributed data interface (FDDI), SONET, or the like have different characteristics from a DS3 medium and therefore suggest the use of iso-frames 20 having entirely different characteristics from those specified in FIG. 2B.

The use of the preamble 24 specified above, which contains 35.625 octets of data set to a logical one value, allows each of nodes 16a-16h (see FIG. 1) to synchronize to an iso-frame 20 within 125 microseconds. For the DS3 version of iso-frame 20 presented in FIG. 2B, each of cells 28 and tunnel 26 contains a padding bit 34b set to a logical zero value followed by no more than 35 octets of data. Since preamble 24 contains 35 octets plus five padding bits all set to a logical one value, this preamble pattern cannot occur anywhere else in iso-frame 20. Consequently, frame synchronization occurs whenever this pattern is recognized. Since this preamble occurs in every one of iso-frames 20, it repeats and is recognizable every 125 microseconds.

Referring back to FIG. 1, the identification of a predetermined instant in every iso-frame 20, such as the end of preamble 24, provides specific advantages in the operation of switching system 10. Each of nodes 16a-16h must establish synchronization with iso-frames 20 before it can transmit outgoing data to a downstream one of nodes 16a-16h. Consequently, synchronization must ripple through all of nodes 16a-16h in switching system 10 before switching system 10 becomes operational. By minimizing the amount of time required to achieve synchronization at each of nodes 16a-16h, the overall time required for switching system 10 to become operational from initialization or from loss of communication between adjacent ones of nodes 16a-16h is minimized.

FIG. 3 shows a block diagram of a generic one of nodes 16a-16h. Consequently, the node illustrated in FIG. 3 is simply labeled node 16. A physical media dependent (PMD) sublayer 36 is the lowest physical layer of node 16. PMD sublayer 36 receives an input from an upstream one of nodes 16 and outputs data to a downstream one of nodes 16 at a media input 38 and a media output 40, respectively. PMD sublayer 36 functions to provide a relatively reliable data bit stream and a data clock to a time multiplexer 42. In addition, time multiplexer 42 supplies a bit stream of data along with a transmission clock to PMD sublayer 36. However, in the ring master one of nodes 16 (see node 16h in FIG. 1), a delay circuit 22 couples between the output data stream provided by time multiplexer 42 and PMD sublayer 36 to provide the delay discussed above in connection with FIG. 1. When node 16 does not represent ring master node 16h, the data bit stream and transmission clock may couple directly from time multiplexer 42 to PMD sublayer 36.

Time multiplexer 42 synchronizes node 16 to iso-frames 20 (see FIG. 2A) and demultiplexes the incoming data bit stream into tunnel 26 and cells 28. Moreover, time multiplexer 42 receives data from overlying physical sublayers in node 16 and recombines such data with an added preamble to generate the bit stream which is output to PMD sublayer 36.

Time multiplexer 42 couples to a tunnel physical sublayer (tunnel PHY) 44 and to a cell handler 46. Tunnel PHY 44 receives data from tunnels 26 of incoming iso-frames 20 (see FIG. 2A) and provides data to time multiplexer 42 for insertion in tunnels 26 of outgoing iso-frames 20. Cell handler 46 receives each of cells 28 from incoming iso-frames 20 (see FIG. 2A) and provides data to time multiplexer 42 for insertion in cells 28 of outgoing iso-frames 20. A packet physical sublayer (packet PHY) 48, a connectionless cell switching physical sublayer (connectionless PHY) 50, a connection-oriented cell switching physical sublayer (connection PHY) 52, and a circuit switching physical sublayer (C.S. PHY) 54 each couple to cell handler 46. Each of packet PHY 48, connectionless PHY 50, connection-oriented PHY 52, and C.S. PHY 54 receive and supply data from and to cell handler 46. Each individual one of cells 28 specifies whether it is dedicated to packet switching service, connectionless cell switching service, connection-oriented cell switching service, or circuit switching service. Thus, such specification directs each of cells 28 to and from a corresponding one of PHYs 48-54. C.S. PHY 54 provides conventional isochronous circuit switched service and may include a conventional TSI therein.

Each of PHY 44 and PHYs 48-52 couples to a Media Access Control (MAC) sublayer 56. MAC sublayer 56 receives and supplies data from the lower PHY levels in a manner similar to that which occurs in the MAC sublayer of a conventional LAN. Consequently, MAC sublayer 56 represents a conventional structure which is known to those skilled in the art. Users 12 indirectly couple to MAC sublayer 56. Those skilled in the art will understand that additional layers (not shown), which include both software and hardware, may reside between users 12 and MAC sublayer 56. Such additional layers are conventionally described as a logical link control sublayer a network layer, a transport layer, and the like.

PMD sublayer 36 of node 16 includes conventional medium interface circuits. Moreover, the specific structure of PMD sublayer 36 depends upon the particular type of medium supplied to PMD sublayer 36 at medium input 38 and supplied by PMD sublayer at medium output 40. Thus, one specific function performed by PMD sublayer 36 interfaces node 16 to specific electrical, optical, or RF interface requirements of the medium to which node 16 interfaces. Other conventional functions performed by PMD sublayer 36 include clock recovery, bit regeneration, line conditioning, and encoding of transmission data and a transmission clock. Although the present invention contemplates the use of conventional structures to perform these functions, the specific structures utilized in performing these functions differ for DS3, FDDI, SONET, or other transmission media.

FIG. 4 is a block diagram that shows time multiplexer 42 in more detail. Thus, time multiplexer 42 receives a received clock signal from PMD sublayer 36 (see FIG. 3) at a clock terminal 58, which couples to clock inputs of an iso-frame synchronizer 60, an octet counter 62, a cell data buffer 64, and a tunnel data buffer 66. In addition, time multiplexer 42 receives received data supplied from PMD sublayer 36 (see FIG. 3) at a terminal 68, which couples to data inputs of iso-frame synchronizer 60, cell data buffer 64, and tunnel data buffer 66. An iso-frame synchronization pulse is supplied at an output of iso-frame synchronizer 60 from a terminal 70, which couples to a start input of octet counter 62. Iso-frame synchronizer 60, octet counter 62, cell data buffer 64, and tunnel buffer 66 collectively form a receiver side 72 of time multiplexer 42.

Iso-frame synchronizer 60 provides a pulse which identifies a predetermined common instant in each of iso-frames 20 (see FIG. 2A). FIG. 5 shows an example of an iso-frame synchronizer 60 for the DS3 format of iso-frame 20 shown in FIG. 2B. As discussed above, this format utilizes 35.625 octets of data in preamble 24 to establish a data pattern that cannot recur at any other location in iso-frame 20. This data pattern consists of all bits in the 35.625 octets being set to a logical one value. Consequently, clock terminal 58 couples to clock inputs of a flip-flop 74 and a counter 76. Terminal 68 couples to a data input of flip-flop 74. An output of flip-flop 74 couples to a start input of counter 76.

In the iso-frame synchronizer 60 depicted in FIG. 5, the data bit stream from PMD sublayer 36 is clocked into flip-flop 74. Whenever a logical zero value appears in this data bit stream, counter 76 is restarted. However, so long as this data bit stream continues to supply logical one data values, counter 76 continues to count. Counter 76 in FIG. 5 restarts counting at a predetermined count, which is established so that approximately 35.625 octets, or 285 bits, of logical one data values will cause counter 76 to assert an active synchronization pulse at a terminal count output thereof. This terminal count output couples to iso-frame synchronizer pulse terminal 70. Consequently, the predetermined common instant in each of iso-frames 20 occurs immediately after the 35.625 octets of logical one data values in preamble 24. Of course, those skilled in the art will understand that formats for iso-frame 20 which differ from the format shown in FIG. 2B suggest a different structure for iso-frame synchronizer 60.

Referring back to FIG. 4, the synchronization pulse output from iso-frame synchronizer 60 starts octet counter 62, which is configured to count data bits in the data bit stream supplied at terminal 68. Counter 62 represents a conventional counter circuit which may additionally include some decoding. Thus, octet counter 62 provides a first output at a tunnel enable terminal 78, which couples to an enable input of input data buffer 66. Octet counter 62 activates this first output when tunnel 26 is present in iso-frame 20 at terminal 68. Consequently, such tunnel data is temporarily stored in tunnel data buffer 66. Tunnel data buffer 66 has a tunnel data output terminal 80, which supplies such tunnel data to tunnel PHY 44 (see FIG. 3).

Likewise, octet counter 62 supplies a second output at a terminal 82, which couples to an enable input of cell data buffer 64. Octet counter 62 activates this second output whenever any of cells 28 are present in iso-frame 20 at terminal 68. Thus, such cell data is temporarily stored in cell data buffer 64. Cell data buffer 64 has an output port 84 that couples to cell handler 46 (see FIG. 3).

Still further, octet counter 62 provides a count value at a cell number terminal 86. This count value supplies a particular number of a cell being received at terminal 68. In addition, octet counter 62 provides a control octet pulse at a terminal 88. Octet counter 62 activates the control octet pulse whenever control field 30 (see FIG. 2A) of a cell is present so that control field 30 may be individually latched in cell handler 46 (see FIG. 3).

Consequently, octet counter 62 simply counts the occurrence of data bits at input terminal 68. Octet counter 62 establishes tunnel 26 and each of cells 28 as continuous, constant bandwidth channels. In the DS3 example of iso-frame 20 shown in FIG. 2B, tunnel 26 consists of 21 octets of data. Thus, for the DS3 example octet counter 62 maintains tunnel 26 as a continuous channel of 1.344 Mbps. Likewise, each of cells 1–18 in FIG. 2B contains 35 octets of data. Thus, octet counter 62 maintains 18 independent cell channels, each of which have a data rate of 2.240 Mbps.

Time multiplexer 42 additionally includes a transmission side 90, which complements receiver side 72. Clock terminal 58 couples to an input of a phase locked loop (PLL) 92, and an output of PLL 92 couples to a transmit clock terminal 94. The transmission clock generated by PLL 92 in time multiplexer 42 maintains substantially the same frequency as the receive clock provided to time multiplexer 42 from PMD sublayer 36 (see FIG. 3). However, PLL 92 operates to remove a significant portion of jitter which may be present in this receive clock.

Terminal 94 couples to a clock input of an octet counter 96, a clock input of a preamble generator 98, a clock input of a cell data buffer 100, and a clock input of a tunnel data buffer 102. In addition, iso-frame synchronizer pulse terminal 70 couples to a start input of octet counter 96, and a first output of octet counter 96 couples to a start input of preamble generator 98. A second output of octet counter 96 couples to a select input of a multiplexer 104, and an output of preamble generator 98 couples to a first data input of multiplexer 104. An output of tunnel data buffer 102 couples to a second data input of multiplexer 104, and an output of cell data buffer 100 couples to a third data input of multiplexer 104. An output of multiplexer 104 couples to a node 106, which provides the transmitted data stream output from time multiplexer 42.

Octet counter 96 plays a complementary role in transmitter side 90 of time multiplexer 42 as octet counter 62 plays in receiver side 72 of time multiplexer 42. Thus, octet counter 96 counts data bits transmitted from time multiplexer 42 to partition iso-frames 20 (see FIG. 2A) into preamble 24, tunnel 26, and cells 28. The selection input of multiplexer 104 is controlled by octet counter 96 to output a preamble, which is generated by preamble generator 98, a tunnel, which is provided by tunnel buffer 102, and cell data, which are provided by cell data buffer 100. Preamble generator 98 may additionally provide a sequence number and the bit padding portions 34a and 34b, discussed above in connection with FIG. 2B.

A data port 108 couples to an input of cell data buffer 100 and supplies input data from cell handler 46 (see FIG. 3). Likewise, a terminal 110 couples to an input of tunnel data buffer 102 and provides tunnel data from tunnel PHY 44 (see FIG. 3). Each of buffers 100 and 102 may advantageously represent FIFOs or other elastic memory devices so that different data rates may be tolerated between cell handler 46 and tunnel PHY 44 on one side of time multiplexer 42 and PMD sublayer 36 on the other.

As discussed above in connection with FIGS. 1 and 3, ring master node 16h contains a delay circuit 22, which couples between time multiplexer 42 and PMD sublayer 36. Delay circuit 22 selectively delays an oldest one of iso-frames 20 circulating in ring 14 while ring master node 16h completes transmission of the most recent one of iso-frames 20 circulating in ring 14. FIG. 6 shows a block diagram of one embodiment of a delay circuit 22. In FIG. 6, iso-frame synchronizer pulse terminal 70 (see FIG. 4) couples to a first input of a control circuit 112, and transmit data terminal 106 couples to a data input of a memory 114. A first output of control circuit 112 couples to an address input of memory 114 at an address port 113. A data output of memory 114 couples to a first data input of a multiplexer 116, and a second output of control circuit 112 couples to a select input of multiplexer 116 at a terminal 115. An 8 KHz clock generator 118 has an output which couples to a second input of control circuit 112 and to an input of a dummy frame generator 120 at a terminal 119. An output of dummy frame generator 120 couples to a second input of multiplexer 116. An output of multiplexer 116 supplies the data stream which is received by PMD sublayer 36, as denoted at terminal 106'.

Delay circuit 22 is controlled by both the receive synchronization signal supplied at terminal 70 and by an 8 KHz pulse signal supplied by 8 KHz clock generator 118. The 8 KHz pulse from 8 KHz clock generator 118 may be either internally generated or synchronized to external signals. The 8 KHz pulse signal has a period of 125 microseconds. Thus, the 8 KHz pulse signal provides a transmission synchronization clock of one pulse for every transmitted iso-frame 20 while the received synchronization signal provides similar information concerning received data. Control circuit 112 utilizes these synchronization signals to generate both read and write addresses for memory circuit 114. The write addresses specify locations in memory 114 where data supplied by time multiplexer 42 (see FIG. 3) is written into memory 114, and the read addresses specify memory locations where data is read from memory circuit 114 for application to PMD sublayer 36 (see FIG. 3). Memory 114 contains a sufficient quantity of storage locations to buffer an entire iso-frame 20.

Multiplexer 116 selects either the output from memory 114 or from dummy frame generator 120 for application to PMD sublayer 36 (see FIG. 3). Control circuit 112 operates the select input of multiplexer 116 so that the output from memory circuit 114 is selected only after a received synchronization pulse is available at terminal 70. Moreover, this selection occurs synchronously with the 8 KHz pulse signal supplied by clock generator 118. However, when operation of switching system 10 (see FIG. 1) initially begins or an existing synchronization is lost, the received synchronization pulse is not available. Until the received synchronization pulse appears, multiplexer 116 selects the output from dummy frame generator 120 to provide dummy frames to PMD sublayer 36 (see FIG. 3). The dummy frame generator supplies preamble 24 (see FIGS. 2A–2B), a tunnel 26 which contains idle bits, and cells 28 which are marked as being idle cells. In addition, dummy frame generator 120 generates all necessary bit padding sections 34a–34b, discussed above in connection with FIG. 2B. Consequently, while all of nodes 16a–16h in switching system 10 begin to sychronize to iso-frames 20, ring master node 16h continues to transmit isochronous frames which are marked as containing empty channels. All these iso-frames 20 are generated at the bit rate required by the existing medium (e.g. DS3, SONET, etc.). Dummy frame generator 120 may be implemented using memory circuits or logic circuits in accordance with specific application requirements.

Control circuit 112 maintains the quantity of data circulating in switching system 10 at a constant level. As discussed above, this constant level equals an integral number of iso-frames 20. FIG. 7 shows a block diagram of one embodiment of control circuit 112. Thus, transmission clock terminal 94 supplies the clock signal generated by time multiplexer 42 and couples to a clock input of a counter 122 and to a clock input of a counter 128. Counter 122 is a free running counter. The output of counter 122 couples to a write address portion of address port 113 (see FIG. 6), which is labeled port 113a in FIG. 7. In addition, port 113a couples to a data input of a latch 124. Iso-frame synchronization pulse terminal 70 couples to a clock input of latch 124 and to a set input of a latch 126. An output of latch 124 couples to a data input of counter 128. Moreover, 8 Khz pulse terminal 119 couples to a load input of counter 128, a reset input of latch 126, and a clock input of a flip-flop 130. An output of latch 126 couples to a data input of flip-flop 130. An output of counter 128 provides the read address portion of address port 113 (see FIG. 6), and is labeled as port 113b in FIG. 7. An output of flip-flop 130 couples to selection terminal 115 to provide a signal which controls the selection input of multiplexer 116 (see FIG. 6).

Control circuit 112 illustated in FIG. 7 operates in connection with a two-port memory for memory 114 (see FIG. 6). However, those skilled in the art may devise other suitable memory circuits as well. The write address for memory 114 is supplied by counter 122. So long as a received clock is available to generate a transmit clock at terminal 94 as discussed above in connection with PLL 92 in FIG. 3, a valid read address and a write address are provided to memory 114. The read and write addresses increment or decrement in step with data supplied to delay circuit 22 from time multiplexer 42. Thus, this data is stored at the locations in memory 114 specified by write address port 113a.

When a received synchronization pulse occurs, the address at which a corresponding data item is stored is recorded in latch 124. Subsequently, when the next 8 KHz pulse occurs, this recorded address is loaded into counter 128, which supplies read addresses to memory 114. Latch 126 and flip-flop 130 change the selection input of multiplexer 116 (see FIG. 6) to select the data provided from memory 114 in synchronism with the 8 KHz pulse. Consequently, this data is read out from memory 114 starting at the address location which was previously recorded in latch 124 and later transferred to counter 128. Memory circuit 114 therefore delays data generated by time multiplexer 42 until a previous iso-frame 20 has been completely transmitted. The delay equals the amount of time occurring between the recording of a beginning address in latch 124 and the transfer of the beginning address to counter 128. Moreover, control circuit 112 continually monitors and adjusts the delay provided by memory 114 so that only an integral number of iso-frames 20 circulate in ring 14 (see FIG. 1).

As shown in FIG. 3, time multiplexer 42 both supplies and receives data to and from tunnel PHY 44. FIG. 8 shows a block diagram of tunnel PHY 44. Tunnel data input terminal 80 from time multiplexer 42 (see FIG. 4) couples to an input of a High Level Data Link Control (HDLC) controller 132. Likewise, a transmission output from HDLC controller 132 couples to tunnel data terminal 110, which is an input to time multiplexer 42 (see FIG. 4). In addition, appropriate clocking signals are utilized to transfer data between HDLC controller 132 and time multiplexer 42. However, such clocking signals are conventional in nature and are omitted in the FIGS.

The preferred embodiment of the present invention contemplates the use of an HDLC format for the transmission of messages through tunnel 26 (see FIG. 2A). As discussed above in connection with FIG. 4, time multiplexer 42 isolates tunnel 26 from the rest of iso-frame 20 so that tunnel PHY 44 concerns itself only with what appears to tunnel PHY 44 as a continuous channel. Consequently, a tunnel frame or message 134 may be constructed in accordance with the HDLC format shown in FIG. 9. In this format, tunnel frame 134 contains data exhibiting only a logical one value during interframe lapses, which occur when tunnel 26 transmits no information, i.e. no tunnel frames 134.

However, a message transmitted through tunnel 26 utilizing tunnel frame 134 first includes a one octet start delimiter 136, which is the HDLC flag (01111110). Next, two octets are dedicated to a node ID 138. Node ID 138 provides an address for the destination of tunnel frame 134. Next, a one octet control field 140 is inserted followed by a variable length user information field 142. After user information field 142, tunnel frame 134 provides a two octet frame check sequence field 144. A one octet end delimiter character 146, which is typically the HDLC flag, follows field 144.

Depending upon the quantity of information contained within user information field 142, tunnel frame 134 may extend over many tunnel 26 fields of many iso-frames 20 or may reside entirely within a single tunnel 26 field of a single iso-frame 20 (see FIG. 2A). Moreover, tunnel frame 134 may begin or end at any point within tunnel 26 of an iso-frame 20. In other words, no requirement exists for tunnel frame 134 to operate synchronously with iso-frames 20.

Referring back to FIG. 8, HDLC controller 132 represents a conventional HDLC controller integrated circuit which generates and recognizes start delimiter 136 and end delimiter 146, can be programmed to recognize node ID 138, and which separates or includes user information 142 from or into tunnel frame 134 (see FIG. 9). Control and data lines from HDLC controller 132 couple to inputs of a receive state machine 148. A service indication output 153 of receive state machine 148 is output from tunnel PHY 44 to MAC sublayer 56 (see FIG. 3).

Additional control and data signals 155 are output from receive state machine 148. Control signals 155 serve as inputs to a transmit state machine 154. Transmit state machine 154 also receives a transmission request signal 157, which is an input to tunnel PHY 44 supplied by MAC sublayer 56 (see FIG. 3). Transmit state machine 154 provides control and data outputs which are input to HDLC controller 132. Data supplied to tunnel PHY 44 from MAC sublayer 56 (see FIG. 3) are input to transmit state machine 154. In addition, a node manager 158 represents a conventional microprocessor circuit which couples to a microprocessor bus interface of HDLC controller 132. Node manager 158 represents the controlling device for node 16 (see FIG. 3).

When HDLC controller 132 receives a tunnel frame 134 (see FIG. 9), tunnel PHY 44 must decide whether to pass the tunnel frame upward to MAC sublayer 56 or to retransmit, i.e. copy, the tunnel frame 134 to an adjacent downstream one of nodes 16a–16h (see FIG. 1). This determination is made by comparing a node ID to ID 138 carried in the frame. Next, the destination node asserts service indication signal 153 output from receive state machine 148 to MAC sublayer 56, and MAC sublayer 56 retrieves the tunnel frame 134 one octet at a time from receive state machine 148. All non-destination ones of nodes 16a–16h simply copy the received circulating tunnel frame 134 to the adjacent downstream one of nodes 16a–16h without communicating with their MAC sublayer 56.

When MAC sublayer 56 requests the transmission of a new tunnel frame 134, transmission request signal 157 is activated and the new tunnel frame 134 is transferred to transmit state machine 154 one octet at a time. Transmit state machine 154 controls HDLC controller 132 so that tunnel PHY 44 either outputs a new tunnel frame 134 supplied by MAC sublayer 56 through memory buffer 156 or a circulating tunnel frame 134, received by HDLC controller 132.

Both receive state machine 148 and transmit state machine 154 may be implemented using conventional programmable logic sequencers, arrays, or other state machine structures which are known to those skilled in the art. FIGS. 10 and 11 present state diagrams which define one embodiment for each of receive state machine 148 and transmit state machine 154, respectively.

Referring to FIG. 10, when a lapse between circulating tunnel frames 134 occurs, receiver state machine 148 resides in an "idle" state 160. Receive state machine 148 may exit idle state 160 only when a transition event 162 occurs. Transition event 162 occurs at the detection of start delimiter 136 (see FIG. 9) by HDLC controller 132 (see FIG. 8). HDLC controller 132 indicates such a detection to receive state machine 148 through the assertion of a control signal supplied to an input of receive state machine 148. When event 162 occurs, receive state machine 148 activates a Transmit Inhibit signal output, which couples to an input of transmit state machine 154, and enters a "waiting for address header" state 164. Entry of receive state machine 148 into state 164 indicates that a reception of a circulating tunnel frame 134 (see FIG. 1) is in progress.

State machine 148 exits state 164 when any of three events occur. A timeout or a detected abort event 166 causes state machine 148 to return to idle state 160. In addition, when event 166 occurs, receive state machine 148 asserts a Transmit Enable signal to transmit state machine 154. The Transmit Enable signal may be implemented by simply removing the Transmit Inhibit signal applied upon entry to state 164.

If event 166 does not happen while state machine 148 waits in state 164, then the next event occurs when HDLC controller 132 (see FIG. 8) receives the node ID field 138 of a circulating tunnel frame 134 (see FIG. 9).

When node ID 138 does not supply a data value matching the ID of the node 16 where tunnel PHY 44 is located, then transition event 168 occurs. On the other hand, if node ID 138 supplies a data value matching the node ID of tunnel PHY 44, then event 170 occurs. When event 168 occurs, state machine 148 enters an "active receive" state 172 and supplies a Transmit Address control signal to transmit state machine 154 (see FIG. 8). The Transmit Address control signal prompts transmit state machine 154 to begin transmission while providing the first parameter to be transmitted (i.e. node ID 138). State machine 148 enters a "waiting for end of data" state 174 upon the occurrence of event 170. In addition, the Transmit Enable signal is asserted to transmit state machine 154 when state machine 148 enters state 174. Accordingly, state machine 148 enters state 172 when a circulating tunnel frame 134 is to be copied to a downstream one of nodes 16a–16h (see FIG. 1), and enters state 174 when a circulating tunnel frame 134 is intended for the one of nodes 16a–16h where tunnel PHY 44 resides.

During state 174, received data is transmitted to MAC sublayer 56. State machine 148 exits state 174 when HDLC controller 132 indicates that end delimiter 146 (see FIG. 9) has been detected or when a transmission has been aborted. This situation is indicated by event 176 in FIG. 10. When transmission is complete, state machine 148 asserts the Service Indication signal to MAC sublayer 56 (see FIG. 3) and reenters idle state 160.

When state machine 148 is in state 172, a circulating tunnel frame 134 must be copied to the adjacent downstream one of nodes 16a–16h. Consequently, an event 178 indicates the reception of a data byte, and event 178 causes a received byte to be passed to transmit state machine 154 so that it may then be passed back to HDLC controller 132 (see FIG. 8). A Transmit Data signal is asserted to transmit state machine 154 so that transmit state machine 154 may issue the byte to HDLC controller 132 to accomplish this retransmission of data. State machine 148 may exit state 172 upon the occurrence of an abort or time out event 180 or upon the reception of end delimiter 146 (see FIG. 9) in an event 182. In event 180, state machine 148 asserts the Transmit Enable signal to transmit state machine 154. Upon the occurrence of event 182, state machine 148 asserts both the Transmit Enable signal to transmit state machine 154 and a Transmit ED (end delimiter) signal to transmit state machine 154 so that transmit state machine 154 may instruct HDLC controller 132 to generate end delimiter 146 in the retransmitted data.

Transmit state machine 154 is described in the state diagram presented in FIG. 11. Transmit state machine 154 operates in an idle state 184 when no circulating tunnel frame 134 (see FIG. 9) data is being received at tunnel PHY 44 and when no request has been received from MAC sublayer 56 (see FIG. 3) for the transmission of a new tunnel frame 134. Transmit state machine 154 exits idle state 144 and enters an "active transmit" state 186 upon the occurrence of an event 188. Event 188 happens when MAC sublayer 56 activates tunnel data request signal 157 (see FIG. 8) to indicate a required transmission of a new tunnel frame 134. Upon the occurrence of event 188, state machine 154 asserts a control signal to HDLC controller 132 which commands controller 132 to generate start delimiter 136 (see FIG. 9).

In state 186, state machine 154 continues to send the new tunnel frame 134 supplied to tunnel PHY 44 from MAC sublayer 56, as indicated in event 190, until the complete tunnel frame 134 has been processed through HDLC controller 132. As indicated in an event 192, if tunnel PHY 44 receives a circulating tunnel frame 134 while state machine 154 transmits the new tunnel frame 134 in active transmit state 186, the Transmit Inhibit signal supplied by receive state machine 148 (see FIGS. 8 and 10) has no effect on transmit state machine 154. In other words, transmit state machine 154 causes tunnel PHY 44 to continue transmitting the new tunnel frame 134 and does not transmit the circulating tunnel frame 134 so long as it begins transmitting the new tunnel frame 134 before receiving the circulating tunnel frame 134. State machine 154 exits active transmit state 186 after the entire new tunnel frame 134 has been processed by HDLC controller 132, as indicated in an event 194. Upon the occurrence of event 194, state machine 154 causes HDLC controller 132 to produce end delimiter 146 (see FIG. 9), and state machine 154 returns to idle state 184.

However, if transmit state machine 154 receives the Transmit Inhibit signal from receiver state machine 148, as indicated in an event 196, prior to the occurrence of the tunnel data request, as shown in event 188, then state machine 154 enters a "waiting for address header" state 198. While in state 198, state machine 154 may return directly to idle state 154 upon the occurrence of a timeout as indicated in an event 200. However, if state machine 154 receives the Transmit Address signal from receiver state machine 148, as indicated in an event 202, then state machine 154 enters a "passive transmit" state 204. As discussed above, the Transmit Address signal is supplied by receiver state machine 148 when node ID 138 of tunnel frame 134 (see FIG. 9) does not match the ID of a node 16a–16h (see FIG. 1) where tunnel PHY 44 (see FIG. 3) is located. This ID mismatch represents the event which causes tunnel PHY 44 to copy a circulating tunnel frame 134 to an adjacent downstream one of nodes 16a–16h. Thus, in event 202 transmit state machine 154 outputs control signals to HDLC controller 132 causing it to transmit start delimiter 136 and node ID 138 supplied from the receive side of HDLC controller 132.

While transmit state machine 154 operates in passive transmit state 204, reception of a Tunnel Data Request signal from MAC sublayer 56 (see FIG. 3) has no effect, as indicated in an event 206. Moreover, as indicated in an event 208, the Transmit Data supplied by receive state machine 148 causes transmit state machine 154 to send the circulating tunnel frame 134 received by HDLC controller 132.

State machine 154 exits passive transmit state 204 upon the occurrence of the Transmit Enable signal or a timeout, as indicated in an event 210. The Transmit Enable signal may occur for the reasons discussed above in connection with FIG. 10. Upon the occurrence of event 210, state machine 154 returns to idle state 184. Alternatively, state machine 154 exits state 204 to idle state 184 upon the occurrence of an event 212. Event 212 represents the reception of end delimiter 146 by receive state machine 148. In this event, transmit state machine 154 commands HDLC controller 132 to send end delimiter 146 prior to returning to idle state 184.

As a consequence of the above-described state definitions for receive and transmit state machines 148 and 154, system 10 (see FIG. 1) accommodates simultaneous transmission of tunnel frames or messages 134. Referring to FIG. 1, the simultaneous transmission occurs, for example, when node 16e begins transmission of a first one of two tunnel messages 134 after, for example, node 16a begins transmission of a second one of the two tunnel messages 134 and before the arrival of the second tunnel message 134 at node 16e. In this example, nodes 16f, 16g, and 16h successfully copy the first tunnel message 134 transmitted by node 16e. However, node 16a continues to transmit the second tunnel message 134, even after the first tunnel message 134 arrives at node 16a. Likewise, nodes 16b, 16c, and 16d successfully copy the second tunnel message 134, but node 16e continues to transmit the first tunnel message 134. In other words, ring 14 acts as though it has been split into two completely independent paths where the first one of two tunnel messages 134 travels successfully between nodes 16e and 16h, and the second one of the two tunnel messages 134 travels successfully between nodes 16a and 16d.

Unlike conventional random access services, such as CSMA/CD, no garbling of transmitted information results from multiple accesses in the present invention. Furthermore, the probability of at least one of the two tunnel messages 134 reaching its intended destination is at least 0.75, of which about 0.25 is the probability that both tunnel messages 134 successfully reach their destinations, assuming point to point transmissions. In addition, a distinct probability exists that either of node 16a or 16e will have completed its transmission of an entire tunnel message 134 prior to reception of a tunnel message 134 from the other one of nodes 16a and 16e.

In the preferred embodiment of the present invention, tunnel messages 134 that fail to reach their destination for various reasons, are not retransmitted by tunnel PHY 44, described above, but are retransmitted by MAC sublayer 56 (see FIG. 3) or other higher layers. Conversely, successfully delivered frames are not acknowledged by tunnel PHY 44 but are acknowledge by MAC sublayer 56 or higher layers within a node 16a-16h. Consequently, tunnel PHY 44 does not implement a back-off algorithm when multiple accesses occurs. A more efficient transmission results when compared to a conventional CSMA/CD algorithm for short messages, such as signaling, sent on long rings with long latencies.

Figure 12:
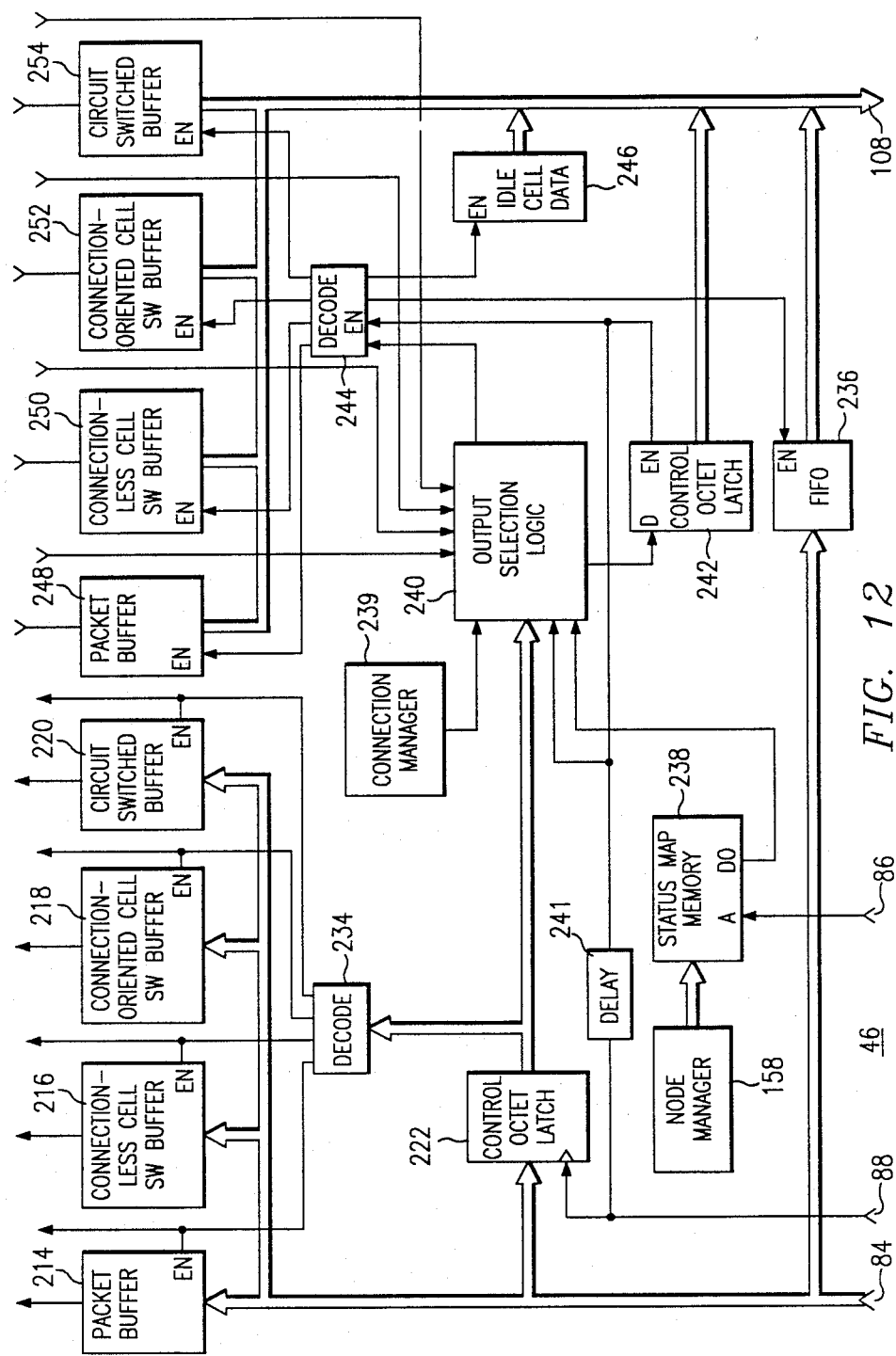
FIG. 12 shows a block diagram of a cell handler portion of the present invention.

FIG. 3 shows that cell handler 46 receives and provides cell data from and to time multiplexer 42. Moreover, cell handler 46 operates independently from tunnel PHY 44, discussed above. FIG. 12 shows a block diagram of cell handler 46. In FIG. 12, cell data output port 84 couples to an input of a control octet latch 222, and a clock input of control octet latch 222 couples to control octet terminal 88, discussed above in connection with FIG. 4. In addition, cell data output port 84 couples to inputs of a packet buffer 214, a connectionless cell switching buffer 216, a connection-oriented cell switching buffer 218, and a circuit switching buffer 220. Each of buffers 214-220 transfers data from time multiplexer 42 (see FIG. 3) to respective ones of packet PHY 48, connectionless PHY 50, connection-oriented PHY 52, and C. S. PHY 54. Buffers 214-220 may be FIFOs or other elastic memory circuits to accommodate different data transmission rates between time multiplexer 42 and PHYs 48-54 residing above cell handler 46.

As discussed above in connection with FIG. 2A, control field 30 of each cell 28 contains sufficient information to specify a particular switching service and various service parameters. Control octet latch 222 stores control field 30 of a cell 28 for use in routing cells 28 from time multiplexer 42 upwards to one of PHYs 48-54 and downwards from one of PHYs 48-54 to time multiplexer 42. FIG. 13 shows a preferred format for control field 30 of cells 28.

Control field 30 includes 8 bits. A first one of the 8 bits is defined as containing a garage flag 224. Garage flag 224 is set by connection manager node 16g (see FIG. 1) to indicate that a particular cell 28 is being removed from service. Such removal may occur when a cell 28 is being adapted for testing or connection-oriented service in the immediate future. Consequently, nodes 16a-16h treat a cell 28 having a set garage flag 224 in a normal manner, except that such a cell 28 must not be used to transport new messages. In other words, each of nodes 16a-16h reads data from a cell 28 with a set garage flag 224 and copies data to downstream nodes when garage flag 224 is set. However, even though a cell 28 with a set garage flag 224 may be marked as being idle, a node 16a-16h may not utilize such a cell 28 for transmission of new messages. After a cell 28 having a set garage flag 224 has cycled around ring 14 at least one time, each of nodes 16a-16h has had a chance to read it. Thereafter, connection manager 16g may specify such a cell 28 as being used for testing, circuit switching service, or the like. Consequently, a mechanism is provided for taking cells 28 out of service without losing service provided to users 12 (see FIG. 1) of such cells 28.

Second and third bits of control field 30 provide a service indicator field 226 which specifies one of four possible modes for a current use of a cell 28. For example, if the second and third bits of control field 30 are set to a 00 logical value, then a circuit switching service is specified. If the second and third bits are set to a 01 logical value, then a cell switching service is indicated. Likewise, if the second and third bits are set to a 10 logical value, then a packet switching service is specified. Finally, if the second and third bits are set to a 11 logical value, then a cell is defined as being idle.

Circuit switching service (00 in field 226) represents the highest access priority and most uniform bandwidth service supplied by system 10 (see FIG. 1). Circuit switching service is suitable for transporting voice or other real-time demanding applications. Consequently, a user 12 (see FIG. 1) who wishes circuit switching service may arrange with connection manager 16g for such circuit switching service. When such circuit switching service has been arranged, then a particular cell 28 having the second and third bits of control field 30 set to a 00 will be allocated for use by such a user 12. This communication between user 12 and connection manager 16g typically occurs through an exchange of relatively short tunnel messages 134 (see FIG. 9) between a node 16a-16h associated with such a user 12 and connection manager 16g. Once this service has been arranged, the subscriber is entitled to access the specified cell at any time without delay. No other user 12, except for a user 12 with whom a connection has been established, may access the specified time slot. Thus, isochronous service is provided, and instant access to switching system 10 is guaranteed. On the other hand, the bandwidth is reserved for such a user even though such a user may not actually use the entire reserved bandwidth over the entire duration of the circuit switched call. As discussed above, connection manager 16g reserves equivalent cell numbers in each of iso-frames 20 which are circulating in ring 14 for the isochronous service. Moreover, those skilled in the art will recognize that a single user 12 may subscribe to, or request the use of, less than an entire cell 28.

Packet switching service (10 in field 226) represents the lowest priority access service provided by switching system 10. In packet switching service, any currently idle cell 28 may be utilized by a packet user 12 to transmit data so long as garage flag 224 is not set. Since either several of cells 28 in an iso-frame 20 may be marked as being idle or none of cells 28 over the course of many iso-frames 20 may be marked as being idle, no bandwidth or access time guarantees are implied in packet switching service. Consequently, packet switching service supplied by network 10 is similar to conventional packet switching service supplied by conventional LANs. However, the available bandwidth for use by the packet switching service depends upon the overall bandwidth of system 10 minus the bandwidth currently allocated to higher priority services. MAC sublayer 56 (see FIG. 3) may implement either random access or deterministic algorithms so that many users of the packet switching service may collectively control access to the packet switching service. If MAC sublayer 56 implements a random access protocol over the packet switching service, a multiple access service similar to that described above in connection with FIGS. 8-11 may result. However, the overall combined service is still subject to the control mechanism established in connection with the garage flag algorithm discussed above. Such algorithms that MAC sublayer 56 may implement for access to the shared medium are conventional in the preferred embodiment of the present invention and are not discussed further herein.

Cells 28 defined as being idle (11 in field 226) in service indicator field 226 do not transport active data. In other words, such cells 28 are completely filled with inactive data which do not form a part of any message. Such cells 28 are therefore available for use by packet switching service users 12 and other higher priority services so long as garage flag 224 is not set.

When service indicator field 226 indicates that cell switching service is specified (01 in field 226), a class of services which reside intermediate between circuit switching service and packet switching service results. A connection establishment flag 228, which is provided by a fourth bit of control field 30, operates in conjunction with a cell switching indication in service indicator field 226 to specify two different types of cell switching services.

One type of cell switching service is a connection-oriented cell switching service. Connection-oriented cell switching service ranks immediately below circuit switching service in access class priority. A user of connection-oriented cell switching service requests the establishment of a connection from connection manager 16g at call set-up time. Connection manager 16g assigns a logical channel number to that call and reserves requested bandwidth in a cell 28 which is already marked as "connection-oriented cell switching". If no such cell 28 exists, a designated one of cells 28 is garraged and then assigned to this service. A virtual channel is established via this process in the designated one of cells 28. No other equivalent cells 28 in other iso-frames 20 circulating in ring 14 is reserved, since contrary to circuit switched channels, these are virtual, nonisochronous channels.

The users of connection-oriented cell switching service share the assigned one of cells 28 on a statistical basis, very much like the users of packet switching networks (e.g. X.25) share a physical channel. Since they do not contend with lower priority service users for this bandwidth, they receive a higher quality of service. However, connection-oriented cell switching service may be displaced by circuit switching service, which has a higher priority. The parameters regulating access to the channel (i.e. average number of cell accesses, peak number, etc.) are set on a per-call basis by connection manager 16g and transmitted to the requesting one of nodes 16a-16h at call set-up, rather than at subscription time as is the case for connectionless service users (discussed below).

Only the users of this service can access the channel reserved to them. The channel (i.e. cell) is marked as being "in use" with service indicator and connection establishment bits set to connection-oriented, cell switching service. Access time and throughput are guaranteed by connection manager 16g, which maintains a list of the present users of the service and their service requirements. When these service requirements cannot be met with the existing channel, a new one is created with a different cell so that new call establishment requests may be satisfied. This type of service is well suited to packet terminals, such as X.25 or start-stop terminals, which have low speed requirements (less than 64 Kbps). Such terminals typically generate small, intermittent bursts for the duration of lengthy sessions. In addition, asynchronous terminals and interactive, terminal-to-host sessions benefit from this service.

Connectionless cell switching service is described in similar terms as connection-oriented cell switching service, except that there is no negotiation with connection manager 16g for the establishment of a connection, and no bandwidth is reserved. Hence, such a message is considered connectionless. Users of connectionless cell switching service must contend for whatever bandwidth is not allocated to the connection-oriented services described above. Since connection manager 16g is not involved in assigning bandwidth to a particular communication, nothing controls whether the total amount of information being offered matches the capacity available. Consequently, there is no guarantee of access delay or throughput as exists in higher priority services. The connectionless cell switched service provides a level of access performance which is intermediate between packet switching service and connection-oriented cell switching service.

Fifth and sixth bits of control field 30 in each of cells 28 serve as a cell lifetime counter 230. One of nodes 16a-16h, such as connection manager 16g, has the task of monitoring the number of times each cell 28 circulates in ring 14. Nodes 16a-16h have a duty to mark the cell lifetime indicator as being 00 when a cell 28 is replaced with data originated at that node. Then, the monitoring one of nodes 16a-16h increments cell lifetime counter 230 of control field 30 each time a cell 28 passes this monitoring point in ring 14. The recipient of the cell 28 may remove the contents of the cell 28 and set lifetime counter 230 to zero. Thus, cell lifetime counter 230 describes the age of a cell as a number of turns around ring 14. If cell lifetime counter 230 reaches a maximum predetermined value, such as three cycles around ring 14, then the monitoring one of nodes 16a-16h returns the cell to an idle status. This operation is intended to scrub dead cells left activated by errors or malfunctions from switching system 10. However, cell lifetime counter 230 has no meaning for idle cells or for cells used for circuit and connection-oriented cell switching service.

A seventh bit of control field 30 is reserved for future use, and an eight bit of control field 30 serves as a last segment flag 232. Last segment flag 232 indicates whether data contained in payload field 32 of cells 28 (see FIG. 2A) is the last segment of a message. When last segment flag 232 is inactive, the entire cell 28 to which last segment flag 232 applies contains only active data. In other words, all data contained within such a cell 28 forms a portion of a message being transmitted using such a cell 28. However, when last segment flag 232 is active, only a portion of the data contained within the corresponding cell 28 represents active data, or information contained in a message. In this situation, a subsequent octet of data in cell 28 serves as a counter which informs PHYs 48–54 (see FIG. 3) in node 16 how many active octets of data are contained within such a cell 28.

Referring back to FIG. 12, such a control field 30 as described in FIG. 13 is latched into control octet latch 222. Service indicator field 226 (see FIG. 13) of control field 30 is routed to a decoder 234 along with connection establishment field 228. Outputs from decoder 234 couple to enable inputs of buffers 214–220 and are supplied as service indication signals to PHYs 48–54, respectively. Thus, payload field 32 (see FIG. 2A) of each cell 28 is routed to a particular one of buffers 214–220 depending upon the definition presented in service indicator field 226 and connection establishment field 228 of control field 30. PHYs 48–54, which are each exclusively associated with only one of the possible services, retrieve data contained in payload fields 32 from a corresponding one of buffers 214–220 when informed of such data through the indication signal supplied by decoder 234.

Cell data output port 84 additionally couples to an input of a FIFO 236 temporarily stores payload fields 32 of cells 28 for use in a loop back operation when a cell 28 is copied to an adjacent downstream one of nodes 16a–16h. Cell number terminal 86, discussed above in connection with FIG. 4, couples to an address input of a cell status map memory 238. Node manager 158, discussed above in connection with FIG. 8, also couples to cell status map 238. Cell status map 238 provides a status output signal which couples to a first input of an output selection logic circuit 240. First octet terminal 88 additionally couples to an input of a delay element 241. An output of delay element 241 couples to a second input of circuit 240. The entire output from control octet latch 222 couples to third inputs of circuit 240. In addition, a connection manager flag generator 239 supplies information which specifies whether the one of nodes 16a–16h is a connection manager or not and couples to a fourth input of circuit 240. Control signals from PHYs 48–54 couple to additional inputs of circuit 240.

Circuit 240 may represent a programmable logic array, PROM, logic sequencer or other similar device. The purpose of circuit 240 is to generate a new control field 30 for each cell 28 output from cell handler 46 and to select outputs from various devices which supply cell data to time multiplexer 42. Thus, a first output from circuit 240 couples to a data input of a control octet latch 242, and a second output of circuit 240 couples to a decoder 244. An output of delay element 241 couples to an enable input of control octet latch 242 and to an enable input of decoder 244. A first output of decoder 244 couples to an enable input of FIFO 236, and a second output of decoder 244 couples to an enable input of an idle cell data generator 246. Third, fourth, fifth, and sixth outputs of decoder 244 couple to enable inputs of a packet buffer 248, a connectionless cell switching buffer 250, a connection-oriented cell switching buffer 252, and a circuit switching buffer 254. Buffers 248–254 temporarily store data supplied by PHYs 48–54 (see FIG. 3), respectively, and may be FIFO or other elastic memory devices to accommodate different data transmission rates between PHYs 48–54 and time multiplexer 42. Outputs of buffers 248–254 couple together, to an output of idle cell generator 246, an output of control octet latch 242, an output of FIFO 236, and to cell data buffer port 108, discussed above in connection with FIG. 4.

The first octet control signal applied at terminal 88, after an appropriate delay in delay element 241, synchronizes the transmit timing for all of cells 28. After this delay, decoder 244 enables either loop-back FIFO 236 if a cell 28 is repeated back to ring 14, idle cell data generator 246 if a cell 28 is being removed, or one of buffers 248–254 if a new cell is being transmitted.

Node manager 158 stores data in memory map 238 which define connections related to specific cell numbers. For example, a node 16a–16h requires information defining the particular cells it has been allocated for circuit switching service. Such information is communicated from higher levels through node manager 158 and map memory 238 to output selection logic circuit 240. Connection manager flag generator 239 and control octet latch 222 provide information to output selection logic circuit 240 which causes circuit 240 to generate garage flag 224 and cell lifetime counter 230, discussed above in connection with FIG. 13. Likewise, the entire control field 30 is input to circuit 240 so that a new control field may be generated which is consistent with a current control field. For example, circuit 240 cannot transmit new data when garage flag 224 is set, circuit 240 specifies connectionless cell or packet switching services only when such cells are previously indicated as being idle, circuit 240 detects cells marked for connection-oriented cell switching service when such cells are received and connection establishment flag 228 is set. In addition, when new messages are transmitted, circuit 240 causes cell lifetime counter 230 to exhibit a 00, and only a connection manager increments the cell lifetime counter or marks cells as being idle when the cell lifetime counter exceeds a predetermined value. Each of nodes 16a–16h sets last segment flag 232 in accordance with control signals received from PHYs 48–54. Moreover, control signals from each of PHYs 48–54 issue a request signal to circuit 240, and circuit 240 establishes a priority scheme to select only one of PHYs 48–54 when multiple requests are received.

In the preferred embodiment, circuit 240 is a state machine, similar to the state machines discussed above in connection with FIG. 8. Thus, first octet terminal 88, after the appropriate latency, provides a signal which initiates control of outputs by circuit 240. First, an output provided by control octet latch 242 is supplied at port 108. Next, for the remainder of the duration of a cell 28, an output is selected from one of FIFO 236, buffers 248–254, or idle cell data generator 246 for application to port 108. Data from FIFO 236 represents a circulating message, data supplied from buffers 248–254 represents a new message corresponding to one of the four services provided by the preferred embodiment of the present invention, and data from idle cell data generator 246 represents data transmitted in cells 28 when cells 28 are marked as being idle.

Figure 14:
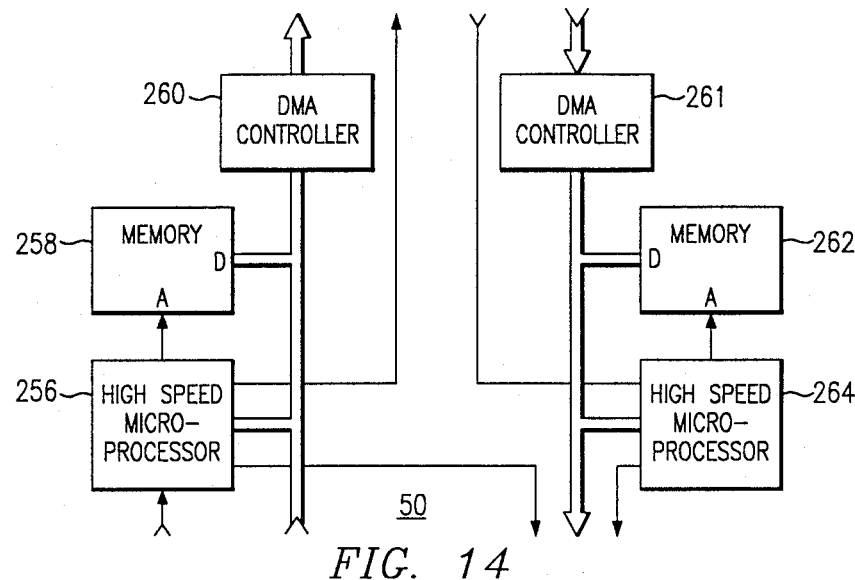
FIG. 14 shows a block diagram of a cell switched physical sublayer portion of the present invention.

FIG. 3 shows that PHYs 48-54 couple between cell handler 46 and MAC sublayer 56. Each of PHYs 48-52 may be implemented using a similar structure, such as that shown in FIG. 14. Referring to FIG. 14, the block diagram of connectionless cell PHY 50 is disclosed. However, those skilled in the art will recognize that each of PHYs 48-52 may advantageously utilize a similar structure. An indication signal provided by decoder 234 of cell handler 46 (see FIG. 12) couples to a first input of a high speed microprocessor 256, such as a bit-slice or microprogrammable microprocessor. Likewise, a microprocessor data bus couples to microprocessor 256 and to connectionless cell switching buffer 216 of cell handler 46 (see FIG. 12). A first output of microprocessor 256 couples to an address input of a memory circuit 258, and a second output of microprocessor 256 represents an indication signal which is routed upward to MAC sublayer 56 (see FIG. 3). The data bus also couples to a data input of memory 258 and to a DMA controller 260. An output of DMA controller 260 couples upward to MAC sublayer 56 (see FIG. 3). A third output of CPU 256 couples downward to cell handler 46. This third output provides a control signal which is input to output selection logic circuit 240 and which indicates when a cell has been consumed locally.

Another DMA controller 261 has an input which receives data from MAC sublayer 56 and an output which couples to a data input of a memory 262, an input of a microprocessor 264, and an input of connectionless cell switching buffer 250 of cell handler 46 (see FIG. 12). Additionally, an input signal from MAC sublayer 56, which represents a request for service signal from MAC sublayer 56, is input to microprocessor 264. A first output from CPU 264 couples to an address input of memory 262, and a second output from CPU 264 represents a request signal which couples downward to output selection logic circuit 240 in cell handler 46. Of course, those skilled in the art will recognize that microprocessors 256 and 254 may advantageously be implemented within a single set of hardware. In other words, both of microprocessors 256 and 264 could be implemented using just one microprocessor. Moreover, a single set of hardware could be used to implement more than one of PHYs 48-52 so that a hardware savings may result.

Only payload fields 32 (see FIG. 2A) of connectionless cell switching cells 28 are delivered to connectionless cell switching PHY 50. One of the functions of connectionless cell switching PHY 50 is to reformat a MAC level frame (not shown) received through switching system 10 for delivery to MAC sublayer 56. Consequently, microprocessor 256 obtains received data in cell payload fields 32 (see FIG. 2) which has reached its destination at one of nodes 16a-16h and reassembles the data into a MAC level frame within memory 258. Then, microprocessor 256 issues an indication to MAC sublayer 56, and MAC sublayer 56 obtains the MAC frame from memory 258 via DMA controller 260. The reassembly process is needed because the size of a MAC frame may exceed the size of a payload field 32 for a single cell 28. Consequently, many of cells 28 may be required to carry the MAC frame. The reassembly process includes the detection of missing segments of data, the detection of first and last segments, and the setting of the last segment counter so that cell handler 46 may append the last segment counter to the last cell.

Figure 15A:
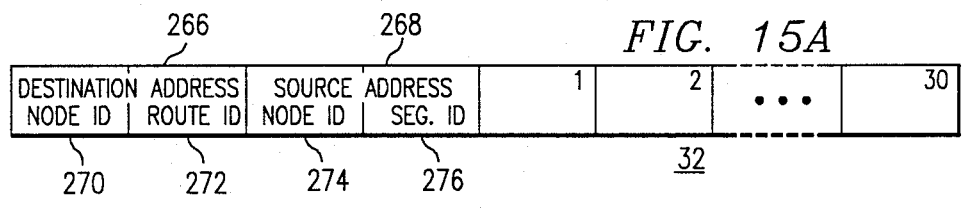
FIGS. 15A–15C illustrate various cell payload formats utilized in connection with the switching system of the present invention.
Figure 15B:
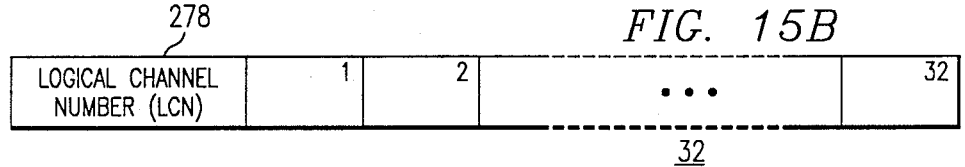
Figure 15C:
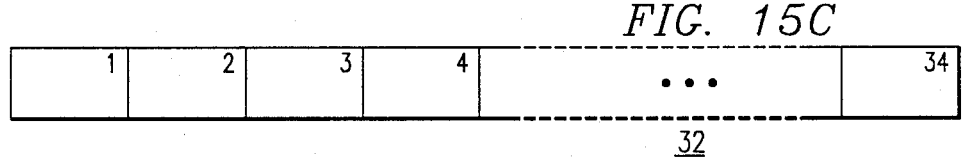

One of the tasks which microprocessor 256 performs is a determination of whether a received cell payload field 32 (see FIG. 2A) is intended for the one of nodes 16a-16h where microprocessor 256 resides. FIG. 15A shows a preferred payload 32 format utilized by cells 28 in connectionless cell switching service and packet service. FIG. 15B shows a preferred format utilized in connection-oriented cell switching service, and FIG. 15C shows a preferred format utilized in circuit switching service. Referring specifically to FIG. 15A, each payload field delivered to connectionless cell switching PHY 50 (see FIG. 14) contains an initial two octet destination address field 266 followed by a two octet source address field 268. Destination address field 266 is divided into a first portion 270, which specifies a node ID, and a second portion 272, which specifies a route ID. Source address 268 is divided into a first portion 274, which specifies a node ID, and a second portion 276, which specifies a sequence number. All additional octets in payload field 32 are reserved for user data and are passed upward to MAC sublayer 56 after such payload fields arrive at their destinations. For the example presented above in connection with FIG. 2B, 30 octets are available within each of cells 28 for user data.

Destination and source address fields 266 and 268, respectively, are physical layer addresses. Thus, such physical layer addresses differ from MAC sublayer addresses which are used by conventional MANs and LANs. Because these physical addresses identify nodes 16a-16h and routes within those nodes, they easily adapt to the topology of a MAN, where each of nodes 16a-16h is responsible for a number of stations connected at the end of those routes, or access trunks. Nodes 16a-16h identify data destined to one of those stations by simply looking at destination address field 266 carried by the cell 28. Furthermore, the routing can be done without having to reassemble the entire MAC frame. Moreover, the routing of cells 28 individually is advantageous when no MAC functions reside locally within a switching node 16a-16h. In this situation, such a one of switching nodes 16a-16h becomes a physical layer bridge. Such a bridge as utilized in connection with the present invention differs from existing bridges utilized in conventional MANs and LANs wherein such conventional bridges require switching to be done at a MAC sublayer. Thus, the conventional, bridges for MANs and LANs must have MAC sublayer functions. Consequently, in a conventional MAN or LAN entire packets are stored before they can be routed to their destinations.

Referring back to FIG. 14, microprocessor 256 examines node ID field 270 to determine if the one of nodes 16a-16h where microprocessor 256 is located is specified in node ID field 270. If the node is not specified, then the cell is copied to an adjacent downstream one of nodes 16a-16h, and a request signal is output from CPU 256 back to output selection logic circuit 240 in cell handler 46 (see FIG. 12). On the other hand, if the destination address indicates this node, then route ID field 272 is utilized to specify a particular user 12 or set of users 12 (see FIG. 1) attached to that route for whom the cell is intended. The comparison of a single node ID identifying the one of nodes 16a-16h where microprocessor 256 is located with a single node ID field 270 saves a significant amount of processing time compared to a conventional technique of sorting through an entire list of users associated with a node 16a–16h to detect a match. Next, source address field 268 is examined so that multiple messages which may be received concurrently in an interleaved fashion may be properly reconstructed. Consequently, node ID field 274 and sequence number field 276 together specify a particular buffer location in memory 256 where an entire MAC frame is to be reassembled.

When MAC sublayer 56 (see FIG. 3) wishes to transmit a new packet through switching system 10, the packet is delivered through DMA controller 261 to memory 262, and a request signal is sent to microprocessor 264. Microprocessor 264 may request directory services from connection manger 16g to obtain routing information for destination address field 266 (see FIG. 15A) of payload field 32 (see FIG. 2A). Microprocessor 264 formats the MAC frame into segments for insertion in payload fields 32 so that the segments can be inserted in one or more of cells 28. In addition, microprocessor 264 monitors the rate at which data is output to cell handler 46. Memory 262 contains various service descriptors which have been supplied by connection manager node 16g (see FIG. 1) at subscription time to control the maximum and average data rates achievable for data transmitted out from connectionless PHY 50.

In addition, microprocessor 264 inserts the own node's ID number in field 274 (see FIG. 15A) and a sequence number into field 276 of payload field 32. Each packet originating from the one of nodes 16a–16h where microprocessor 264 is located receives a unique sequence number. The originating node ID and sequence number enables a receiving node to distinguish concurrently received packets from each other. Furthermore, it permits segmeted packets to be received concurrently in an interleaved fashion. This ability to distinguish different packets from different users allows two or more users 12 to simultaneously gain access to their respective LANs and begin a transmission toward a third user of the MAN. No common arbitration mechanism is required for specifying access by multiple users and the different packets are not lost, delayed, or garbled. After the MAC frame has been segmented into payload fields 32 for application into cells 28, the payload fields 32 are transmitted downward into the FIFO which serves as connectionless cell switching buffer 250 of cell handler 46 (see FIG. 12). Next, microprocessor 246 issues a request signal to output selection logic circuit 240 of cell handler 46 (see FIG. 12) so that cell handler 246 will recognize that new data is contained within buffer 250 and is awaiting transmission when an available cell may be found.

Packet PHY 48 and connection-oriented cell switching PHY 52 are similar in structure to connectionless cell switching PHY 50, shown in FIG. 14. However, the payload format for cells dedicated to connection-oriented cell switching service differs from the payload format utilized for connectionless cell switching service, as is shown in FIG. 15B. As shown in FIG. 15B, only a logical channel number (LCN) 278 field is included within payload field 32. This leaves a total of 32 octets for user data within each payload field 32 of a cell 28 in the preferred embodiment of the present invention. Consequently, PHY 52 need only examine LCN field 278 to determine whether a virtual circuit terminates in this one of nodes 16a–16h. In the connection-oriented cell switching service, the destination knows the source because the connection has been prearranged through connection manager 16g. Therefore, both source and destination are uniquely identified by LCN 278.

Circuit switched service utilizes a payload 32 format which is shown in FIG. 15C. In FIG. 15C the entire payload field 32 is reserved for user data. Consequently, circuit switched service may utilize the same structure which is shown in FIG. 14. However, C. S. PHY 54 does not include any service description monitoring and maintaining of transmissions within prescribed bandwidths as discussed above in connection with connectionless PHY 50. Moreover, C. S. PHY 54 need not examine or supply destination or source addresses. In the example presented above in connection with FIG. 2B, 34 octets of user data are available within each cell 28. However, a single user 12 (see FIG. 1) may subscribe to as few as only one bit within a circuit switched cell 28 or as many as all octets within a circuit switched cell 28, depending on bandwidth requirements. The TSI function within PHY 54 receives the entire cell and allocates the subscribed time slot to a user 12 in accordance with a connection prearranged through connection manager 16g.

In summary, the present invention provides an improved switching network 10 which is suitable for use in a large metropolitan area. Undesirable effects of ring latency are not present in switching system 10 because ring 14 supports multiple data items within the ring at any given time. Thus, the network can be extended over a very large geographical area. A wide variety of switching services are provided by switching system 10. Specifically, cell switching services provide a performance level which is intermediate between conventional circuit and packet switching services. Consequently, the user of system 10 may select a particular level of service which more adequately suits the user's needs. Moreover, any of the services provided by switching system 10 may be provided concurrently with any other service provided by switching service 10. For example, voice data, video data, and packet switched computer data may all be accommodated on switching system 10 concurrently. A random access service is provided by tunnel 26, and this random access service supports multiple messages at any given instant in time. In addition, several deterministic services are provided in such a manner that the entire medium is partitioned into individual bandwidth portions which can fairly and easily be adapted to the needs of many users.

For example, the connectionless PHYs in various nodes maintain access control mechanisms which are fair to all users. First, in the cell switching mode no collisions can occur due to the fact that access to a cell is granted only after the cell handler in that particular node has found the cell idle or the cell otherwise becomes available at that node. This condition cannot be detected by any other node at the same time. Thus, cells cannot be overwritten. Moreover, cells can be reused more than once around the ring. For instance, after a cell reaches its destination and becomes empty, it may be immediately reused. Consequently, overall utilization of the total network capacity improves when compared to conventional switching networks. Furthermore, the improvement in utilization increases with distance and network size.

Still further, each connectionless PHY maintains an access discipline wherein access to idle cells are restricted to the average and peak values per unit of time requested at subscription. This discipline ensures that each connectionless PHY obtains the quality of service it asks for during the subscription phase. Moreover, each connectionless PHY can concurrently segment and reassemble multiple MAC packets from and to multiple sources or destinations. This is done on a cell-by-cell basis, with various buffers, each buffer being assigned to a MAC packet and being segmented and reassembled in various stages of filling or emptying out a MAC packet. The packet PHY is identical to the connectionless PHY with all the average and peak parameters disabled.

The foregoing description uses preferred embodiments to describe the present invention. However, those skilled in the art will recognize that many changes and modifications to these preferred embodiments may occur without exceeding the scope of the present invention. For example, the present invention need not utilize any specific media, frame format, cell format, control field format, number of cells per frame, or the like. Rather, the examples presented herein are utilized to aid understanding of the present invention. In addition, the present invention need not, for example, achieve synchronization instantly but could utilize other preamble formats from the one described herein to achieve synchronization more slowly. However, overall performance would suffer. Such tradeoffs may be made by those skilled in the art. Still further, nothing in the present invention prevents the use of multiple concentric rings wherein each ring has its own ring master. Such a topology may in fact provide advantages due to the redundancy of media and an improved overall bandwidth when all rings are correctly operating. The above and other changes and modifications to the embodiments described above are intended to be included within the scope of the present invention.

What is claimed is:

1. A distributed switching system comprising:
    a plurality of nodes coupled together at physical medium dependent sublayers thereof to form a ring wherein each of said nodes receives incoming data from a first adjacent one of said nodes and transmits outgoing data to a second adjacent one of said nodes, one of said nodes designated as a ring master node;
    means, coupled to said physical medium dependent sublayer at said ring master node, for delaying outgoing data transmitted from said ring master node relative to incoming data received at said ring master node;
    means for controlling said delaying means to maintain a constant quantity of data circulating in said ring wherein said constant quantity of data is an integral number of frames;
    means, coupled to said physical medium dependent sublayer within each of said nodes, for dedicating a first portion of each of said frames to a random access service; and
    means, coupled to said physical medium dependent sublayer within each of said nodes, for dedicating a second portion of each of said frames to a deterministic access service.

2. A system as claimed in claim 1 wherein said controlling means is configured to maintain the quantity of data circulating in said ring at approximately at an integral multiple of 125 microseconds.

3. A system as claimed in claim 1 additionally comprising means, coupled to said physical medium dependent sublayer within each of said nodes, for identifying a predetermined instant within every one of said frames in a period of time which is not greater than the duration of a single one of said frames.

4. A system as claimed in claim 1 wherein said means for dedicating comprises means for maintaining a constant bandwidth of said first portion of each of said frames.

5. A system as claimed in claim 1 additionally comprising:
    means, coupled to said dedicating means in a first one of said nodes, for receiving a circulating message transmitted from said first adjacent node for said first one of said nodes using said random access service; and
    means, coupled to said dedicating means in said first one of said nodes, for transmitting one of said circulating message and a new message to said second adjacent node for said first one of said nodes using said random access service.

6. A system as claimed in claim 5 wherein said transmitting means comprises means for initiating a transmission of said new message upon the receipt of a transmission request signal except when a reception of said circulating message is in progress.

7. A system as claimed in claim 5 wherein said receiving means comprises means for determining if said circulating message is destined for said first one of said nodes.

8. A system as claimed in claim 7 wherein said transmitting means comprises means, coupled to said receiving means, for transmitting said circulating message received at said receiving means when said circulating message is not destined for said first one of said nodes.

9. A system as claimed in claim 8 wherein said transmitting means comprises means for transmitting said new message and not transmitting said circulating message when said transmission of said new message begins prior to said reception of said circulating message.

10. A distributed switching system comprising:
    a plurality of nodes coupled together at physical medium dependent sublayers thereof to form a ring wherein each of said nodes receives incoming data from a first adjacent one of said nodes and transmits outgoing data to a second adjacent one of said nodes, one of said nodes being designated as a ring master node;
    means, coupled to said physical medium dependent sublayer at said ring master node, for delaying outgoing data transmitted from said ring master node relative to incoming data received at said ring master node;
    means for controlling said delaying means to maintain a constant quantity of data circulating in said ring wherein said constant quantity of data is an integral number of frames;
    means, coupled to said physical medium dependent sublayer within each of said nodes, for dedicating a first portion of each of said frames to a random access service;
    means, coupled to said physical medium dependent sublayer within each of said nodes, for dedicating a second portion of each of said frames to a deterministic access service;
    means, coupled to said physical medium dependent sublayer within a first one of said nodes, for receiving a circulating message transmitted from said first adjacent node for said first one of said nodes using a random access service and for determining if said circulating message is destined for said first one of said nodes; and means, coupled to said physical medium dependent sublayer in said first one of said nodes, for transmitting one of said circulating message and a new message to said second adjacent node from said first one of said nodes using said random access service;

said transmitting means comprising means, coupled to said receiving means, for transmitting said circulating message received at said receiving means when said circulating message is not destined for said first one of said nodes and for transmitting said new message and not transmitting said circulating message when said transmission of said new message begins prior to reception of said circulating message.

11. A distributed switching system comprising:

a plurality of nodes coupled together at physical medium dependent sublayers thereof to form a ring wherein each of said nodes receives incoming data from a first adjacent one of said nodes and transmits outgoing data to a second adjacent one of said nodes, one of said nodes being designated as a ring master node;

means, coupled to said physical medium dependent sublayer at said ring master node, for delaying said outgoing data transmitted from said ring master node relative to said incoming data received at said ring master node;

means for controlling said delaying means to maintain a constant quantity of said incoming and outgoing data circulating in said ring wherein said constant quantity of data forms an integral number of frames; and means, coupled to said physical medium dependent sublayer within each of said nodes, for dividing each of said frames into a first portion thereof which includes a plurality of independent cells wherein each of said cells contains control information to specify one of a plurality of distinct deterministic access services to which said cells are dedicated.

12. A system as claimed in claim 11 additionally comprising means, coupled to said physical medium dependent sublayer within each of said nodes, for dividing each of said frames into a second portion thereof which is dedicated to a random access service.

13. A system as claimed in claim 11 wherein said dividing means comprises means for maintaining a constant bandwidth for each of said cells throughout said frames.

14. A system as claimed in claim 11 additionally comprising:

means, coupled to said physical medium dependent sublayer within each of said nodes, for identifying a predetermined instant within each of said frames; and means, coupled to said identifying means, for counting the occurrence of said incoming data from said predetermined instant to distinguish one cell from another cell within said frames.

15. A system as claimed in claim 14 additionally comprising means, coupled to said physical medium dependent sublayer within at least one of said nodes, for decoding a control field of each cell to determine if cells are marked for future removal from service.

16. A system as claimed in claim 14 additionally comprising means, coupled to said physical medium dependent sublayer within at least one of said nodes, for decoding a control field of each cell to determine if cells provide one of circuit switching, cell switching, and packet switching access services.

17. A system as claimed in claim 16 additionally comprising second means, coupled to said physical medium dependent sublayer within said at least one of said nodes, for decoding said control field of each cell to determine if cells provide one of a connection-oriented cell switching service and a connectionless cell switching service.

18. A system as claimed in claim 17 additionally comprising means, coupled to said decoding means, for detecting if a destination address field included within cells that provides one of said connectionless cell switching service and said packet switching service specifies said at least one of said nodes.

19. A system as claimed in claim 18 additionally comprising means, coupled to said second decoding means, for associating a source node address field included within each cell that provides said connectionless cell switching and packet switching services with a corresponding message to distinguish said corresponding message from other concurrently received messages.

20. A system as claimed in claim 19 additionally comprising means, coupled to said second decoding means, for associating a source sequence number included within each cell that provides said connectionless cell switching and packet switching services with said corresponding message to distinguish said corresponding message from said other concurrently received messages.

21. A system as claimed in claim 20 additionally comprising:

means, coupled to said decoding means, for segmenting first packets of data into portions of said first packets which are smaller than the size of said cells; and means, coupled to said decoding means, for reassembling second packets of data from portions of said second packets which are smaller than the size of said cells.

22. A system as claimed in claim 14 additionally comprising:

means, coupled to said physical medium dependent sublayer within one of said nodes, for monitoring the number of cycles each cell experiences around said ring; and means, coupled to said monitoring means, for marking cells that experience greater than a predetermined number of cycles as being idle.

23. A system as claimed in claim 14 additionally comprising means, coupled to said physical medium dependent sublayer within at least one of said nodes, for decoding a control field of each cell to determine if cells are incompletely filled with active data.

24. A system as claimed in claim 23 additionally comprising means, coupled to said decoding means, for examining an octet of data within each cell that is incompletely filled with active data to obtain a count value that represents the number of active octets of data in each cell that is incompletely filled with active data.

25. A distributed switching system comprising:

a plurality of nodes coupled together at physical medium dependent sublayers thereof to form a ring wherein each of said nodes receives incoming data from a first adjacent one of said nodes and transmits outgoing data to a second adjacent one of said nodes, one of said nodes being designated as a ring master node;

means, coupled to said physical medium dependent sublayer at said ring master node, for delaying said outgoing data transmitted from said ring master node relative to said incoming data received at said ring master node;

means for controlling said delaying means to maintain a constant quantity of said incoming and outgoing data circulating in said ring wherein said constant quantity of data forms an integral number of frames;

means, coupled to said physical medium dependent sublayer within each of said nodes, for dividing each of said frames into a first portion thereof which includes a plurality of independent cells wherein each of said cells contains control information to specify one of a plurality of distinct deterministic access services to which said cells are dedicated and into a second portion thereof which is dedicated to a random access service;

means, coupled to said physical medium dependent sublayer within each of said nodes, for identifying a predetermined instant within each of said frames;

means, coupled to said identifying means, for counting the occurrence of said incoming data from said predetermined instant to distinguish one cell from another cell within said frames; and means, coupled to said counting means within at least one of said nodes, for decoding a control field of each cell to determine if cells are marked for removal from service and for decoding said control field to determine if cells provide one of circuit switching, cell switching, and packet switching deterministic access services.

26. A method of switching data in a distributed switching system having a plurality of nodes coupled together at physical medium dependent sublayers thereof to form a ring wherein each of said nodes receives data from a first adjacent one of said nodes and transmits data to a second adjacent one of said nodes, said method comprising the steps of:

delaying outgoing data transmitted from a ring master one of said nodes relative to incoming data received at said ring master node;

controlling the duration of delay in said delaying step to maintain a constant quantity of incoming and outgoing data circulating in said ring wherein said constant quantity of data forms an integral number of frames;

dividing each of said frames into first and second portions wherein said first portions are dedicated to a random access service; and dedicating said second portions to a deterministic access service.

27. A method as claimed in claim 26 wherein said controlling step maintains the quantity of data circulating in said ring at substantially an integral multiple of 125 microseconds.

28. A method as claimed in claim 26 additionally comprising the step of identifying a common predetermined instant of every one of said frames in a period of time which is not greater than the duration of a single one of said frames.

29. A method as claimed in claim 26 wherein said dividing step further comprises the step of maintaining a constant bandwidth of said first portion of each of said frames.

30. A method as claimed in claim 26 additionally comprising the steps of:

receiving, at a first one of said nodes, a circulating message transmitted from said first adjacent node for said first one of said nodes using said random access service; and transmitting, from said first one of said nodes, one of said circulating message and a new message to said second adjacent node for said first one of said nodes using said random access service.

31. A method as claimed in claim 30 wherein said transmitting step comprises the step of initiating a transmission of said new message upon the receipt of a transmission request signal except when said receiving step is in the process of receiving said circulating message.

32. A method as claimed in claim 30 wherein said receiving step comprises the step of determining if said circulating message is destined for said first node.

33. A method as claimed in claim 32 wherein said transmitting step transmits said circulating message received in said receiving step when said circulating message is not destined for said first node.

34. A method as claimed in claim 33 wherein said transmitting step transmits said new message and not said circulating message when said transmission of said new message begins prior to receipt of said circulating message.

35. A method of switching data in a switching system having a plurality of nodes coupled together to form a ring wherein each of said nodes receives incoming data from a first adjacent one of said nodes and transmits outgoing data to a second adjacent one of said nodes, said method comprising the steps of:

delaying said outgoing data transmitted from one of said nodes relative to said incoming data received at said one node;

controlling the duration of delay in said delaying step to maintain a constant quantity of said incoming and outgoing data circulating in said ring wherein said constant quantity of data is an integral number of frames; and dedicating a first portion of each of said frames to having a plurality of independent cells wherein each of said cells specifies one of a plurality of distinct deterministic access services to which said cell is dedicated.

36. A method as claimed in claim 35 additionally comprising the step of dedicating a second portion of each of said frames to a random access service.

37. A method as claimed in claim 35 additionally comprising the steps of:

identifying a predetermined instant within each of said frames; and counting the occurrence of said incoming data from said predetermined instant to distinguish one cell from another cell within said frames.

38. A method as claimed in claim 37 additionally comprising the step of decoding a control field of each cell to determine if cells are marked for removal from service.

39. A method as claimed in claim 37 additionally comprising the step of decoding a control field of each cell to determine if cells provide one of circuit switching, cell switching, and packet switching access services.

40. A method as claimed in claim 39 additionally comprising the step of decoding said control field of each cell to determine if cells provide one of a connection-oriented cell switching service and a connectionless cell switching service.

41. A method as claimed in claim 40 additionally comprising the step of including a destination address within cells that provides one of said connectionless cell switching service and said packet switching service.

42. A method as claimed in claim 41 additionally comprising the step of including a source node address within each cell that provides said connectionless cell switching service so that concurrently received messages are distinguishable from one another.

43. A method as claimed in claim 42 additionally comprising the step of including a source sequence number within each cell that provides said connectionless cell switching service so that concurrently received messages are distinguishable from one another.

44. A method as claimed in claim 40 additionally comprising the step of including a logical channel number within cells that provide said connection-oriented cell switching service to uniquely identify a connection.

45. A method as claimed in claim 37 additionally comprising the steps of:
monitoring, within a first one of said nodes, the number of cycles each cell experiences around said ring; and
forcing, at said first one of said nodes, cells that experience greater than a predetermined number of cycles to be idle.

46. A method as claimed in claim 37 additionally comprising the step of encoding a control field of each cell to specify when cells are incompletely filled with active data.

47. A method as claimed in claim 46 additionally comprising the step of generating, for inclusion within each cell that is incompletely filled with active data, a count value that represents the number of active octets of data in each cell that is incompletely filled with active data.

48. A distributed switching system comprising:
a plurality of nodes coupled together at physical medium dependent sublayers thereof to form a ring wherein each of said nodes receives incoming data from a first adjacent one of said nodes and transmits outgoing data to a second adjacent one of said nodes, one of said nodes designated as a ring master node;
means, coupled to said physical medium dependent sublayer at said ring master node, for delaying outgoing data transmitted from said ring master node relative to incoming data received at said ring master node;
means for controlling said delaying means to maintain a constant quantity of data circulating in said ring wherein said constant quantity of data is an integral number of frames;
means, coupled to said physical medium dependent sublayer within each of said nodes, for dedicating a first portion of each of said frames to a random access service;
means, coupled to said dedicating means in a first one of said nodes, for receiving a circulating message transmitted from said first adjacent node for said first one of said nodes using said random access service and for determining if said circulating message is destined for said first one of said nodes; and
means, coupled to said dedicating means in said first one of said nodes, for transmitting one of said circulating message and a new message to said second adjacent node for said first one of said nodes using said random access service;
said transmitting means comprising means coupled to said receiving means, for transmitting said circulating message received at said receiving means when said circulating message is not destined for said first one of said nodes and for transmitting said new message and not transmitting said circulating message when said transmission of said new message begins prior to reception of said circulating message.

49. The method of claim 1 wherein said means for dedicating a second portion comprises means for selectively dedicating a second portion of each of said frames to either a guaranteed-bandwidth or non-guaranteed-bandwidth access service.

50. A method of switching data in a distributed switching system having a plurality of nodes coupled together at physical medium dependent sublayers thereof to form a ring wherein each of said nodes receives data from a first adjacent one of said nodes and transmits data to a second adjacent one of said nodes, said method comprising the steps of:
delaying outgoing data transmitted from a ring master one of said nodes relative to incoming data received at said ring master node;
controlling the duration of delay in said delaying step to maintain a constant quantity of incoming and outgoing data circulating in said ring wherein said constant quantity of data forms an integral number of frames;
dividing each of said frames into first and second portions wherein said first portions are dedicated to a random access service;
receiving, at a first one of said nodes, a circulating message transmitted from said first adjacent node for said first one of said nodes using said random access service; and
transmitting, from said first one of said nodes, one of said circulating message and a new message to said second adjacent node for said first one of said nodes using said random access service, wherein said circulating message received in said receiving step is transmitted when said circulating message is not destined for said first node and wherein said new message and not said circulating message is transmitted when said new message begins prior to receipt of said circulating message.

51. The method of claim 26 wherein said step of dedicating said second portions comprises the step of selectively dedicating said second portions to either a guaranteed-bandwidth or non-guaranteed-bandwidth access service.

52. A method of switching data in a distributed switching system having a plurality of nodes coupled together at physical medium dependent sublayers thereof to form a ring wherein each of said nodes receives data from a first adjacent one of said nodes and transmits data to a second adjacent one of said nodes, said method comprising the steps of:
delaying outgoing data transmitted from a ring master one of said nodes relative to incoming data received at said ring master node;
controlling the duration of delay in said delaying step to maintain a constant quantity of incoming and outgoing data circulating in said ring wherein said constant quantity of data forms an integral number of frames;

dividing each of said frames into first and second portions wherein said first portions are dedicated to a random access service; and dedicating said second portions to a deterministic access service.

* * * * *